US009166949B2

(12) United States Patent
Kumar et al.

(10) Patent No.: US 9,166,949 B2
(45) Date of Patent: Oct. 20, 2015

(54) METHOD AND SYSTEM OF MANAGING A CAPTIVE PORTAL WITH A ROUTER

(71) Applicants: Vivek R Kumar, Murrysville, PA (US); Deependra Tewari, Ghaziabad (IN)

(72) Inventors: Vivek R Kumar, Murrysville, PA (US); Deependra Tewari, Ghaziabad (IN)

(73) Assignee: QLICKET INC., Murrysville, PA (US)

( * ) Notice: Subject to any disclaimer, the term of this patent is extended or adjusted under 35 U.S.C. 154(b) by 0 days.

(21) Appl. No.: 13/912,148

(22) Filed: Jun. 6, 2013

(65) Prior Publication Data

US 2014/0366117 A1 Dec. 11, 2014

Related U.S. Application Data

(60) Provisional application No. 61/656,942, filed on Jun. 7, 2012.

(51) Int. Cl.
*H04L 29/06* (2006.01)

(52) U.S. Cl.
CPC ..................................... *H04L 63/02* (2013.01)

(58) Field of Classification Search
CPC combination set(s) only.
See application file for complete search history.

(56) References Cited

U.S. PATENT DOCUMENTS

| | | | |
|---|---|---|---|
| 6,636,894 B1 * | 10/2003 | Short et al. | 709/225 |
| 7,689,716 B2 * | 3/2010 | Short et al. | 709/246 |
| 2007/0162607 A1 * | 7/2007 | Droms et al. | 709/228 |
| 2010/0107223 A1 * | 4/2010 | Zheng | 726/3 |
| 2011/0004913 A1 * | 1/2011 | Nagarajan et al. | 726/1 |
| 2012/0084852 A1 * | 4/2012 | Ong | 726/12 |
| 2012/0246553 A1 * | 9/2012 | Ong | 715/234 |
| 2012/0290711 A1 * | 11/2012 | Upham et al. | 709/224 |
| 2013/0111024 A1 * | 5/2013 | Setia et al. | 709/225 |
| 2014/0090030 A1 * | 3/2014 | Ong | 726/4 |
| 2014/0123267 A1 * | 5/2014 | Preiss et al. | 726/14 |

* cited by examiner

*Primary Examiner* — Jeffrey Pwu
*Assistant Examiner* — William Corum, Jr.

(57) ABSTRACT

In one exemplary embodiment, a computer-implemented method of a providing a captive portal with a router includes implementing a hotspot managed by a router. The hotspot comprises an Internet-access over a WLAN through a router communicatively coupled to an Internet service provider. The WLAN is identified with a service set identifier (SSID). A connection with a client device is initiated. An HTTP request to a web server from the client device is detected. An internet communication is restricted, with a firewall rule, to a Transmission Control Protocol (TCP) port used by a HTTP or a TCP port used by an alternative HTTP Secure port. The HTTP request is transparently routed to an internal HTTP proxy server running on an alternative HTTP TCP port in the router. The internal HTTP proxy server determines a requested web site's uniform resource locator (URL) and determines whether the requested web site's URL is allowed into a walled garden maintained by the router.

14 Claims, 31 Drawing Sheets

METHOD AND SYSTEM OF MANAGING A CAPTIVE PORTAL WITH A ROUTER

CROSS-REFERENCE TO RELATED APPLICATIONS

This application claims priority from U.S. Provisional Application No. 61/656,942, filed Jun. 7, 2012. This application claims priority from U.S. Provisional Application No. 61/825,087, filed May 19, 2013. These applications are hereby incorporated by reference in their entirety for all purposes.

BACKGROUND OF THE INVENTION

1. Field

This application relates generally to computer networking, and more particularly to a method and system of managing a captive portal with a router.

2. Related Art

A captive portal technique can cause a client on a network (e.g. a public hot spot) to view a special web page (e.g. for user-authentication purposes, for user-identification purposes, etc.) before accessing the Internet. Captive portals can be implemented in a variety of contexts. For example, a proprietor of a public space (e.g. an airport, a restaurant, a café, etc.) may desire to provide Internet services to the public. The proprietor can utilize a captive portal to ensure proper use of the Internet by the public. The proprietor can utilize a captive portal to maintain a record of users that have utilized the captive portal for statistical and/or legal purposes. Consequently, captive portal techniques have increased in popularity. Thus, additional methods and systems are desired for improving current captive portal techniques.

BRIEF SUMMARY OF THE INVENTION

In one exemplary embodiment, a computer-implemented method of providing a captive portal with a router includes implementing a hotspot managed by a router. The hotspot comprises an Internet-access over a WLAN through a router communicatively coupled to an Internet service provider. The WLAN is identified with a service set identifier (SSID). A connection with a client device is initiated. An HTTP request to a web server from the client device is detected. An internet communication is restricted, with a firewall rule, to a Transmission Control Protocol (TCP) port used by a Hypertext Transfer Protocol (HTTP) or a TCP port used by an alternative HTTP Secure port. The HTTP request is transparently routed to an internal HTTP proxy server running on an alternative HTTP TCP port in the router. The internal HTTP proxy server determines a requested web site's uniform resource locator (URL) and determines whether the requested web site's URL is allowed into a walled garden maintained by the router, wherein the router serves a light Hypertext Markup Language (HTML) web page that redirects a web browser of the client device to an internal web server where a captive portal is hosted when the requested web site's URL is not allowed into the walled garden, and wherein the router routes a request for the requested web site's URL by the web browser of the client device to an internal web server associated with the requested web site's URL when the requested web site's URL is allowed into the walled garden. The web browser of the client device is connected with the internal webserver. The HTML page served by the internal HTTP proxy server is obtained, with the internal web server. A screenshot of a requested web site is generated by retrieving the requested website. A captive portal's welcome page over the screenshot is served with the internal webserver.

Optionally, it can be periodically determined, with a timed thread implemented in the router, that an active session between the roister and the client device is less than an allowed session time. It can be determined that the client device is associated to the SSID when the active session between the router and the client device is less than the allowed session time. The active session can be closed when the client device is not associated to the SSID. A permission in a router firewall provided for the client device can also be removed. The router can automatically resolve the requested web site's URL to the internal address of the WLAN using an internal Domain Name System (DNS) server acting as a master server for a domain party providing the WLAN. The TCP port used by the HTTP can be the TCP port 80. The TCP port used by an alternative HTTP Secure port can be the TCP port 8443.

BRIEF DESCRIPTION OF THE DRAWINGS

The present application can be best understood by reference to the following description taken in conjunction with the accompanying figures, in which like parts may be referred to by like numerals.

FIG. 8 depicts another example screen shot of an interstitial web page of an advertiser that has been reached via a link in an interstitial advertisement video, according to some embodiments.

FIG. 10 depicts an example screen shot of a captive-portal landing page served after a user has been authenticated, according to some embodiments.

The Figures described above are a representative set, and are not an exhaustive with respect to embodying the invention.

DESCRIPTION

Disclosed are a system, method, and article of manufacture of managing a captive portal with a router, according to some embodiments. Although the present embodiments have been described with reference to specific example embodiments, it will be evident that various modifications and changes may be made to these embodiments without departing from the broader spirit and scope of the particular example embodiment.

References throughout this specification to "one embodiment," "an embodiment," or similar language mean that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will, recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed, are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of live depicted method. Additionally, the order in which a particular method occurs may or may not strictly adhere to the order of the corresponding steps shown.

Exemplary Processes

Figure 1:
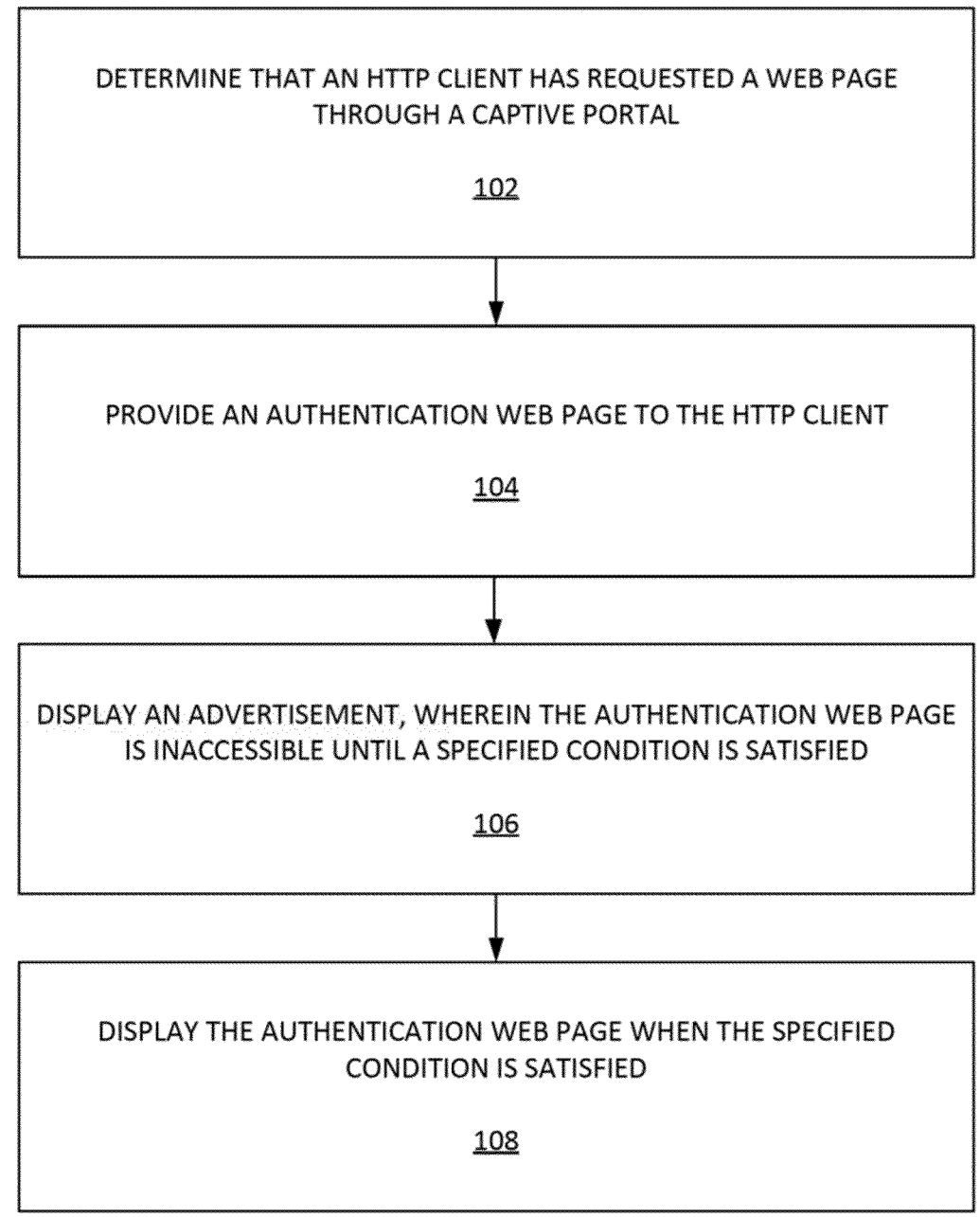
FIG. 1 depicts a flow diagram of an example process of presenting an advertisement to a captive-portal client, according to some embodiments.

FIG. 1 depicts a flow diagram of an example process 100 of presenting an advertisement to a captive-portal client, according to some embodiments. In step 102 of process 100, it is determined that an HTTP client has requested a web page through a captive portal. As used herein, an HTTP client can include a software application for retrieving, presenting, and traversing information resources on the World Wide Web (WWW) such as a web browser. Moreover, while FIG. 1 depicts process 100 utilizing an HTTP client, it is noted that in other embodiments, a client application can utilize other protocols such as Real Time Streaming Protocol (RTSP) and the like to access content through the Internet. Thus, the HTTP client is provided by way of example and not limitation.

An example of a captive portal can include an implementation of a captive portal technique (e.g. utilizing various redirection techniques such as rewriting the address bar's value to a new URL, etc.) with an IEEE 802.11 wireless local area network (WLAN) (e.g. a 'hotspot'). Generally, a captive portal technique can cause an HTTP client on the network to complete an authentication process provided by an authentication web page before accessing the rest of the Internet. An authentication page can be a web page presented by a captive portal for authentication and/or payment purposes such as a login page. For example, the authentication web page can implement a variety of functions such as require authentication, payment, display an acceptable use policy and/or require the user to agree to specified terms. The captive portal technique can be implemented at the router level. Various embodiments of example implementations of a captive portal are provided in greater detail infra.

In step 104 of process 100, the authentication web page can be provided to the HTTP client. It is noted that the authentication web page can include instructions to be implemented prior to allowing a user access to an authentication process. For example, in step 106 of process 100, instructions can cause an advertisement to be displayed with the web browser. An advertisement can be selected by an advertisement management server according to various parameters such as the category of the hotspot (e.g. airport hotspot, in a café, etc.), if an advertisement campaign is currently active, the type of client device (e.g. desktop or mobile), etc.

The authentication web page may not be accessible until a specified condition is satisfied. A specified condition can include actions such as playing a video of an advertisement (e.g. with an HTML5 video tag), requiring a user to engage with an advertisement in some manner (e.g. click a button, play the advertisement for a specified period, input information, download an application, etc.). In step 108, the authentication web page is displayed, and accessible when the specified condition is satisfied.

It is noted that other types of action-based solutions can be implemented in lien of advertisements in other example embodiments. Various examples of action-based solutions can include: displaying an advertisement, completing a survey, providing additional verification of identity using a game or Captcha, and the like.

Figure 2:
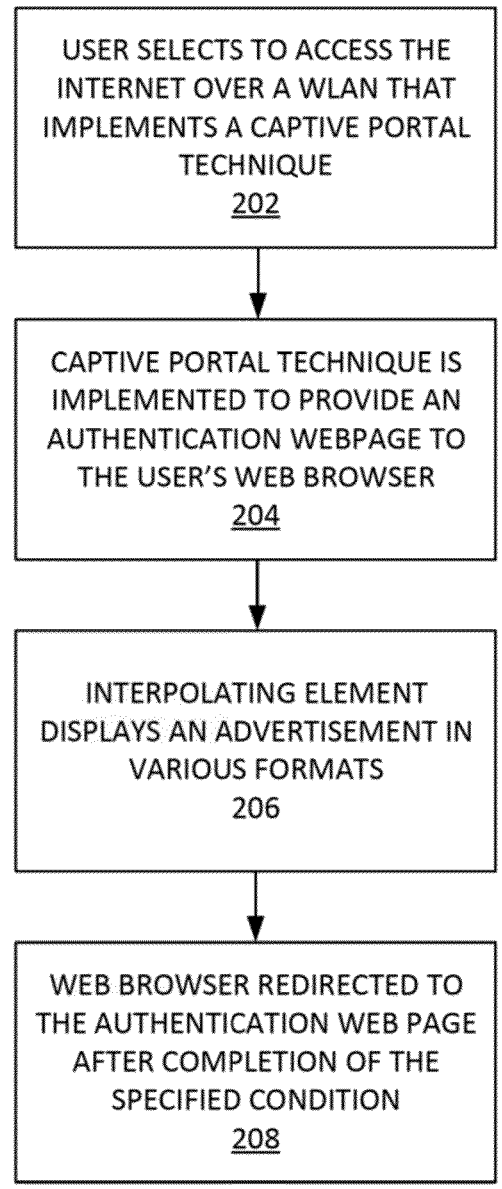
FIG. 2 provides an example process of presenting an advertisement to a captive-portal desktop client, according to some embodiments.
Figure 3:
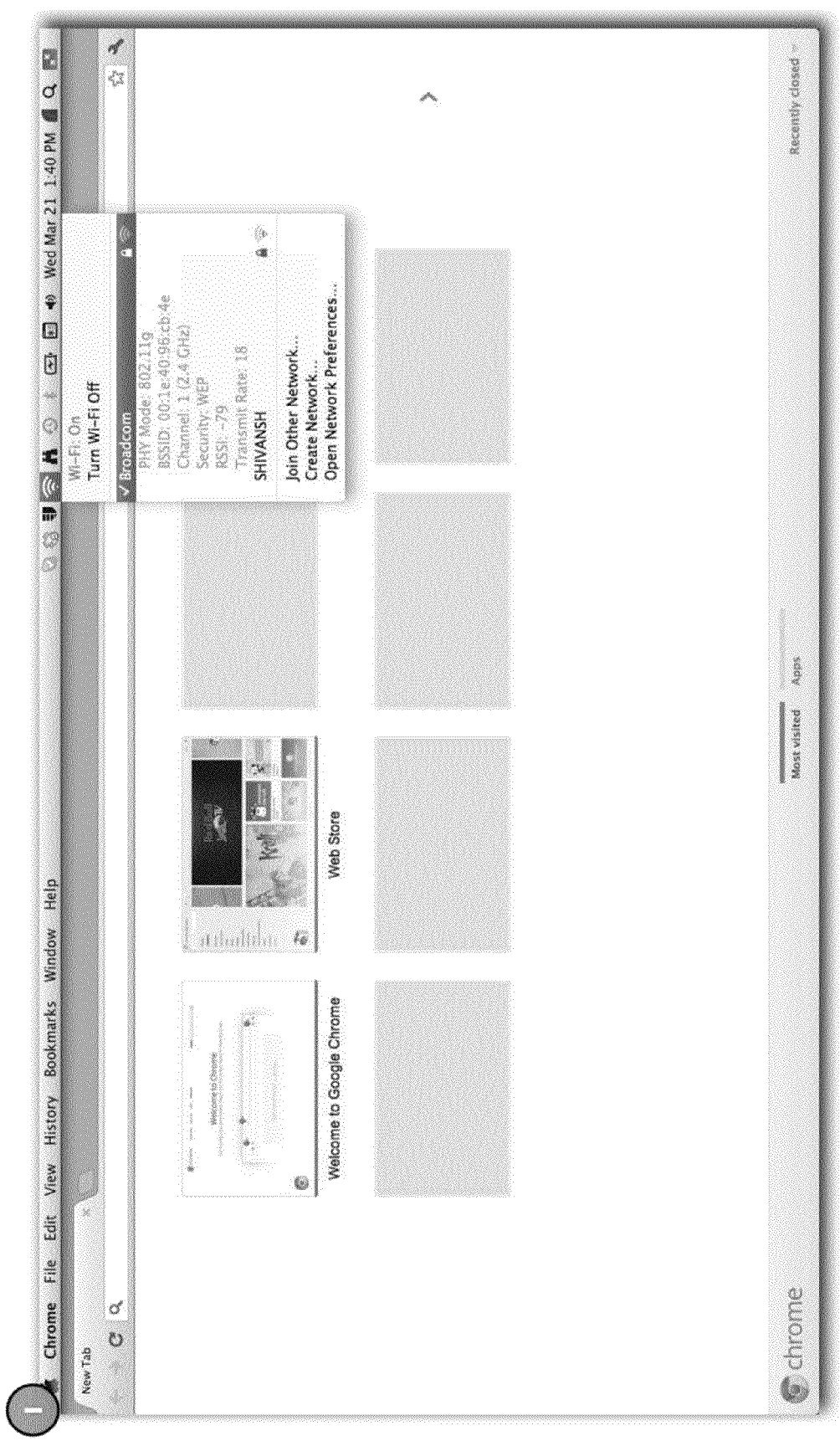
FIG. 3 depicts an example of a user selecting an SSID of a partner WLAN, according to some embodiments.

FIG. 2 provides an example process 200 of presenting an interstitial advertisement to a captive-portal desktop client, according to some embodiments. In step 202 of process 200, a user can select to access the Internet over a WLAN that implements a captive portal technique. For example, a user can select an SSID of a WLAN provided by a third-party enterprise such as a partner corporation of an entity that provides the advertisements. In a particular example, the user selects 'Broadcom' with a web browser optimized for a desktop environment. A more detailed screen shot of this step is provided in FIG. 3.

Figure 4:
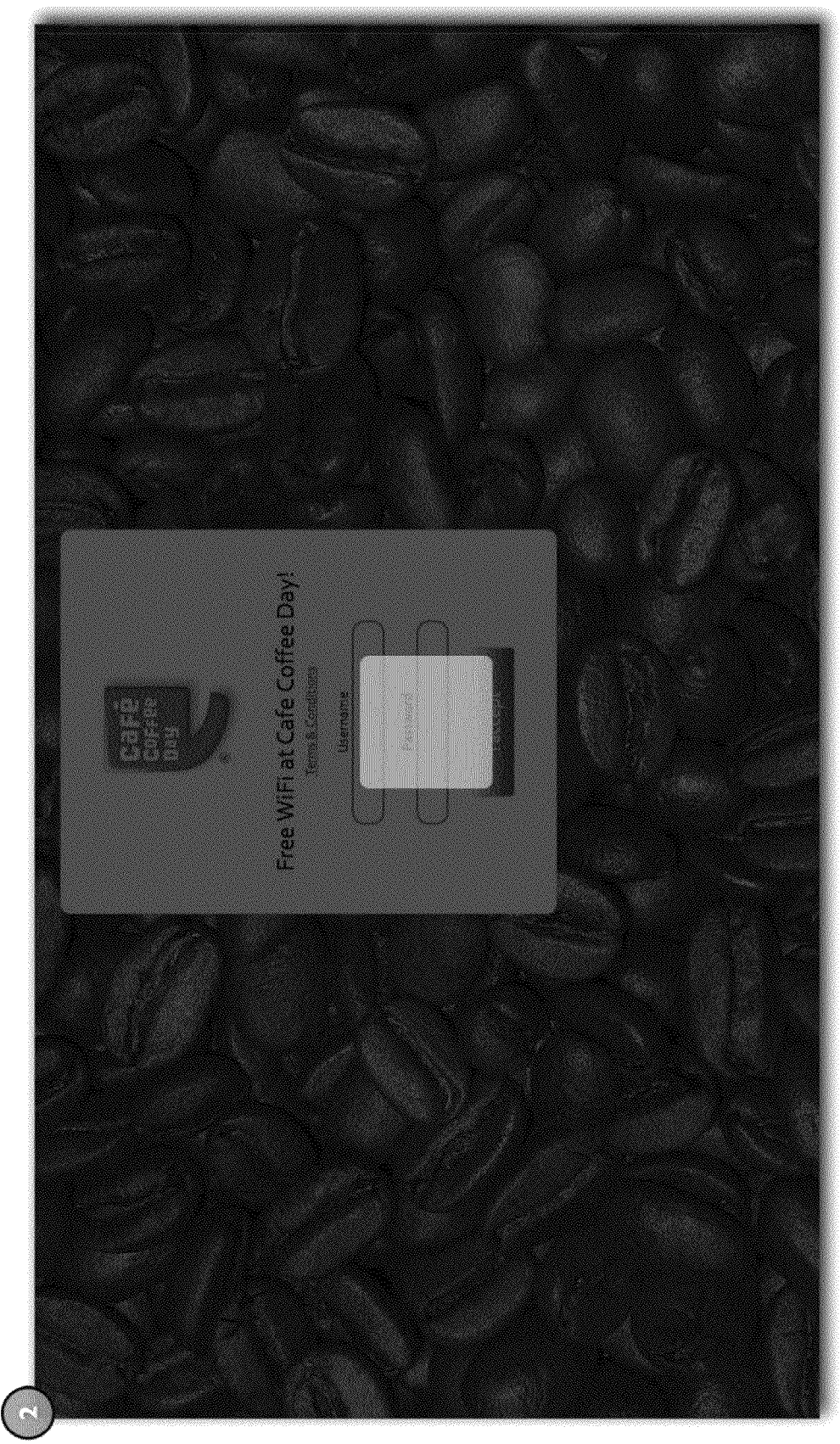
FIG. 4 depicts an example screen shot of automatic web browser redirection from a captive-portal authentication page to an interstitial advertisement video, according to some embodiments.
Figure 5:
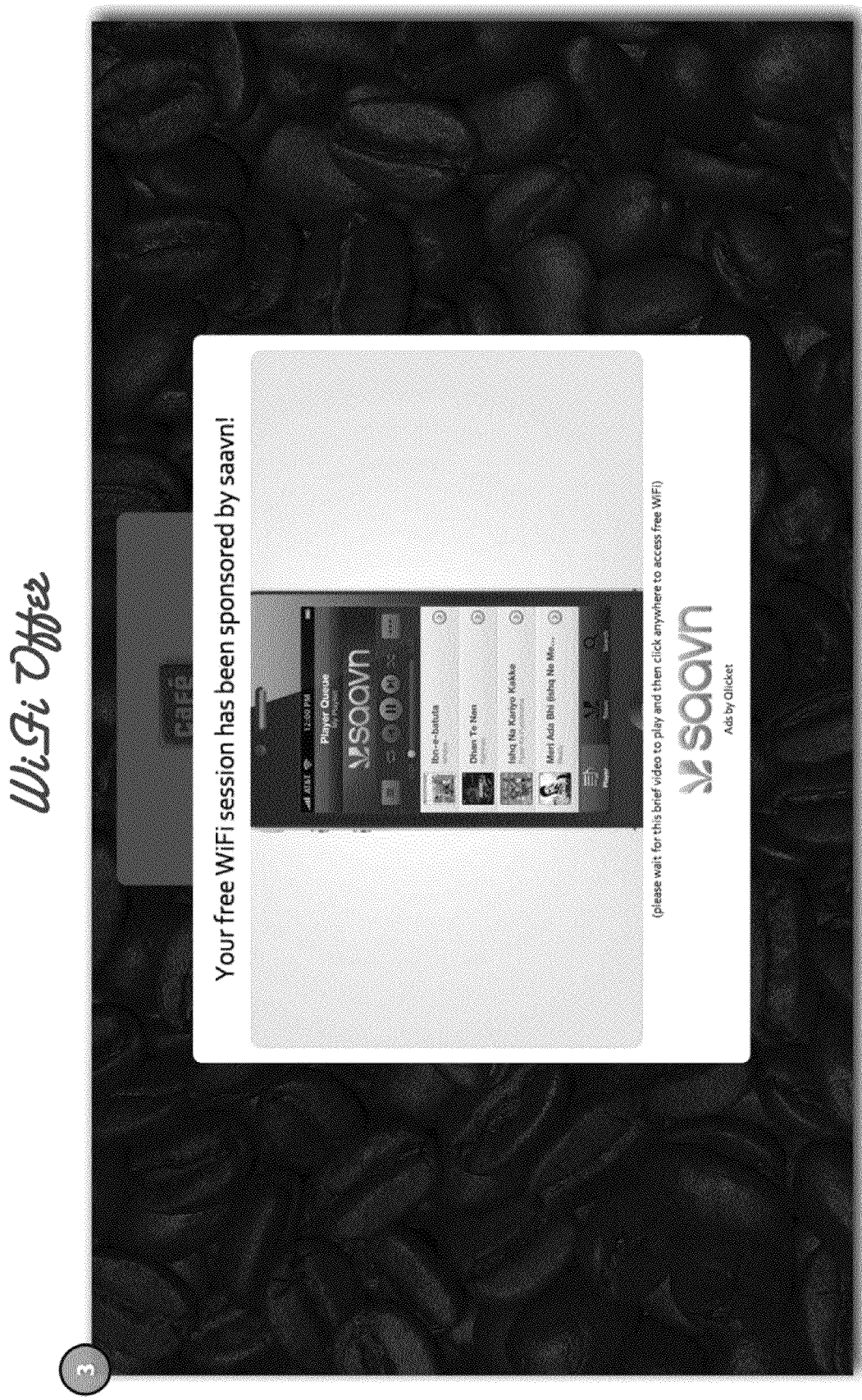
FIG. 5 depicts an example screen shot of an interstitial advertisement video, according to some embodiments.
Figure 6:
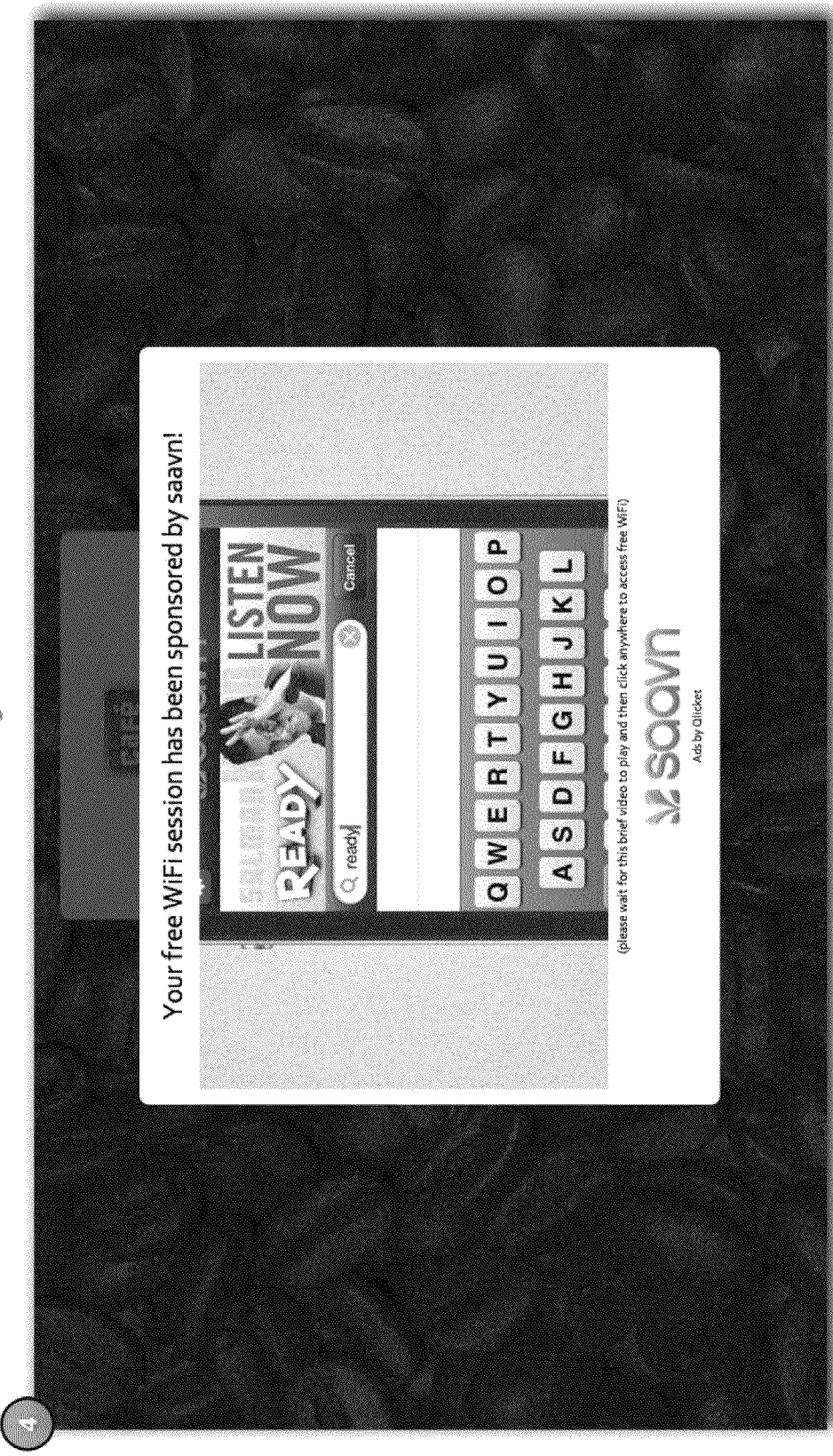
FIG. 6 depicts another example screen shot of an interstitial advertisement video, according to some embodiments.
Figure 7:
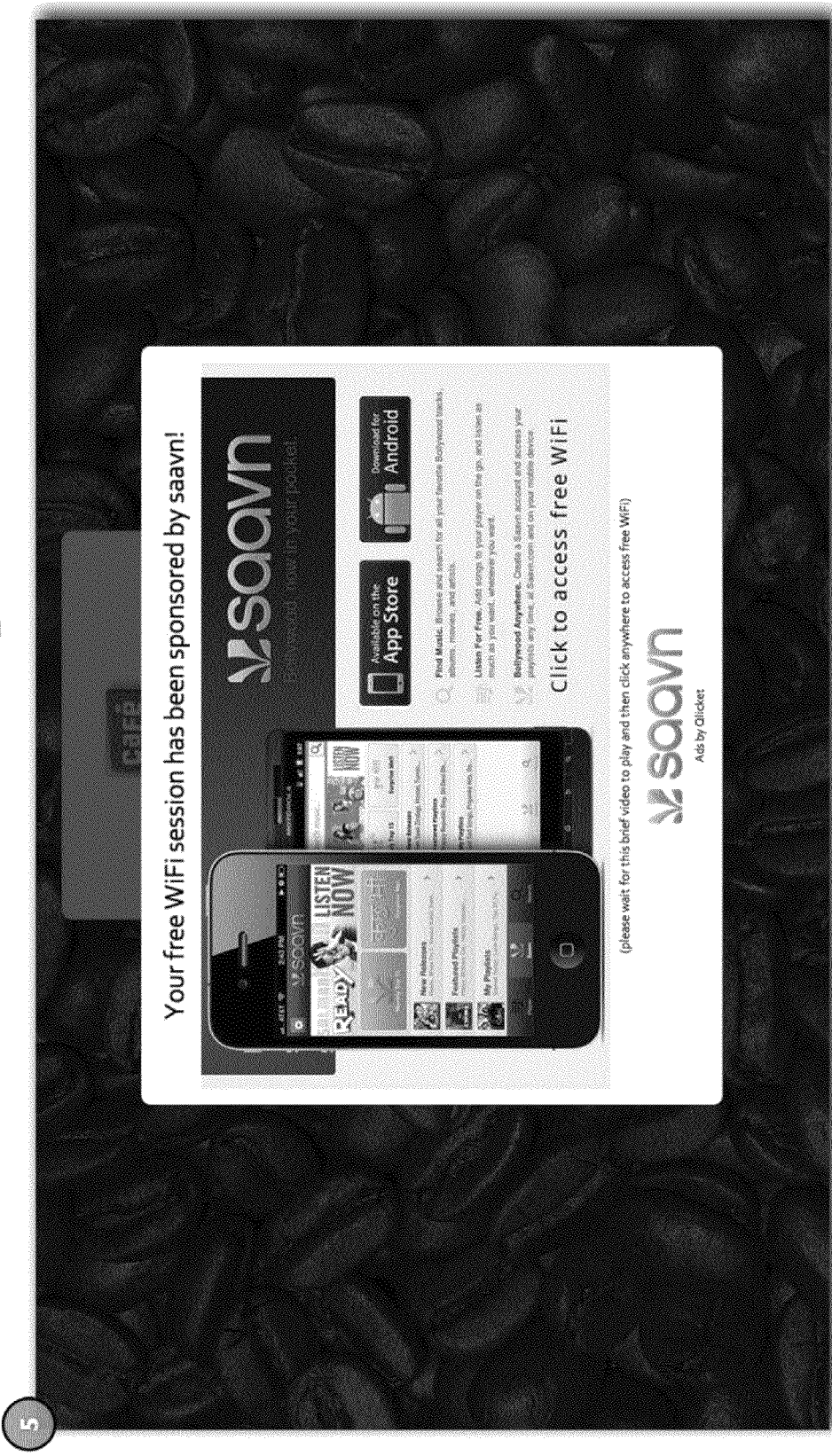
FIG. 7 depicts yet another example screen shot of an interstitial advertisement video, according to some embodiments.

In step 204 of process 200, a captive portal technique such as a redirection operation is implemented to provide an authentication webpage to the user's web browser. The authentication web page can include Instructions to redirect (e.g. with client-side URL re-writing in the address bar) the user's web browser to an advertisement. A more detailed screen shot of this step is provided in FIG. 4. FIG. 4 depicts the authentication web page overlapped by an interpolating element such as an interstitial web page, a popup box (e.g. a new web browser window on top of the authentication web page's window) that includes an inline frame or other display element. The screenshot depicts the interstitial web page in the process of growing over the authentication page window. An example of an interpolating element is provided in FIG. 5 as an interstitial web page that has taken over the web browser window. In step 206 of process 200, the interpolating element can display an advertisement in various formats such as an HTML5 video, an interactive web page, an image sprite, a flash object, a Java applet, etc. In the particular example of FIGS. 5-8, an interstitial advertisement video is displayed. In one example, the web browser may not be able to access other information until the interstitial advertisement video is completed. FIGS. 5-8 depict various versions of the interstitial advertisement according to a particular example sequence. A user may 'click through' the interstitial advertisement of FIG. 7 to the advertiser's web site presented in FIG. 8. The advertiser's web site can be whitelisted such that it can be accessed prior to authentication of a client with the captive portal (see infra for further explanation of whitelisting techniques in a captive portal).

It is noted that a user may not be able to return to the authentication web page until some specified condition such as completion of viewing the interstitial advertisement video and/or 'clicking through' to the advertiser's web site has been completed. For example, the authentication web page can be configured to continuously serve an interstitial advertisement video until confirmation is received that the Interstitial advertisement video has been played to completion (or some other specified amount period of time).

Figure 9:
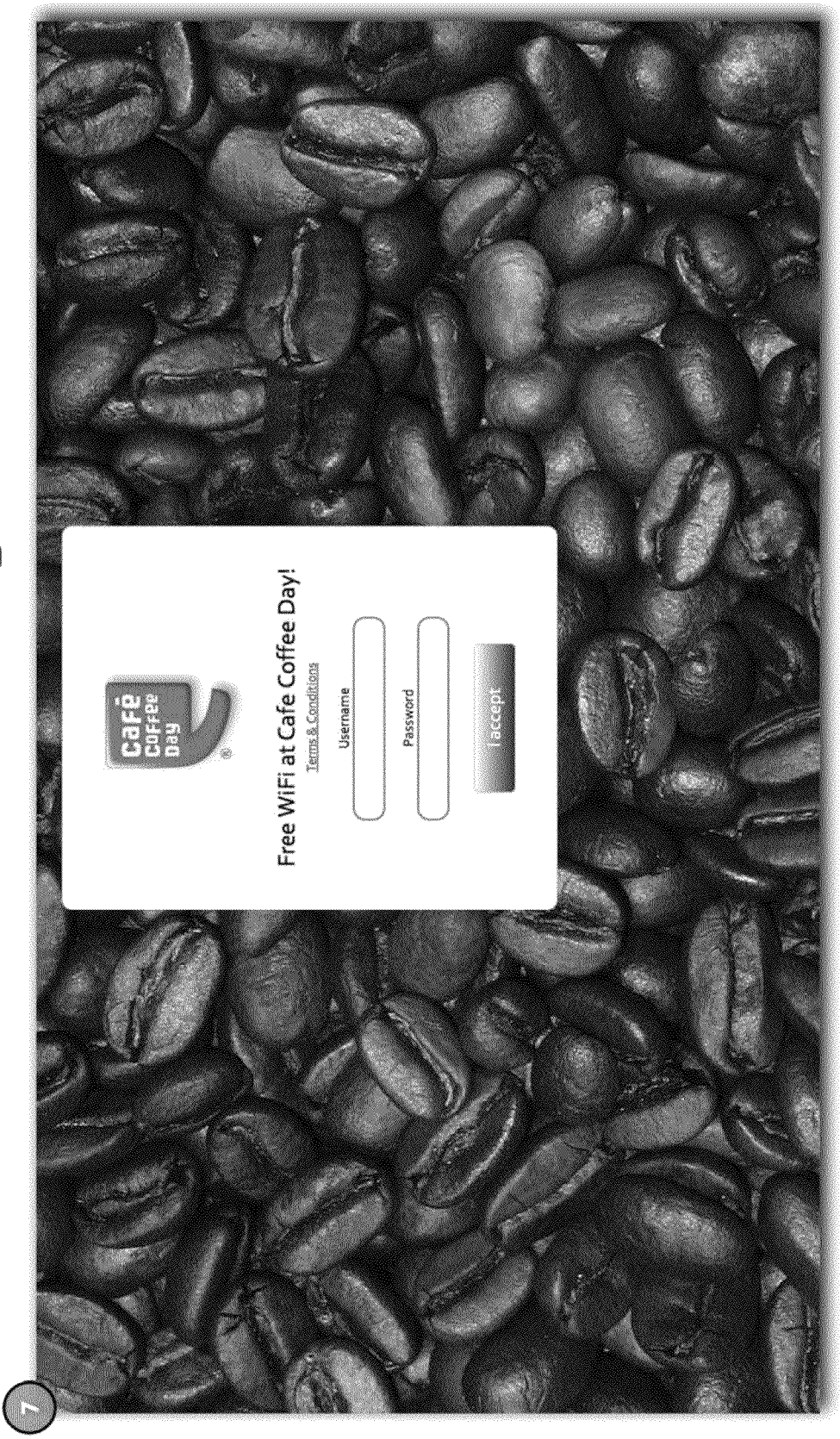
FIG. 9 depicts an example screen shot of a captive-portal authentication page provided after the presentation of the interstitial advertisement video, according to some embodiments.

In process 200, the web browser can be redirected to the authentication web page after completion of the specified condition on step 208 of process 200. A more detailed screen shot of this step is provided in FIG. 9. Additionally, in process 200, the web browser can be redirected to a landing page upon successful completion of the authentication process. It is noted that a plurality of landing pages can be provided. A more detailed screen shot of one example of step 208 is provided in FIG. 10.

In some examples, the redirections can be performed from the client side. For example, on coming back to a captive portal's authentication web page, a client-side JavaScript (i.e. ECMAScript) library can search for an indication as to whether the user agent has satisfied a specified condition (e.g. played, an interstitial advertisement video and the like). Example indications can include a cookie in a desktop's inline frame, a cookie in a mobile device's view set and/or a query parameter that indicates whether the specified condition has been satisfied. If an indication is located, then the web browser can access the authentication web page. However, if no indication is located, then the interstitial advertisement video (or other interpolating element) can be displayed again.

It is noted that process 200 can include an additional step (not shown) for determining the type of user agent used to access the authentication page. For example, if the user agent is a web browser of a desktop-type device (e.g. a laptop computer) then process 200 can be implemented. However, if it is determined that the user agent is a web browser of a mobile device (e.g. a smart phone, a tablet computer, and the like) another process optimized for the display parameters of a mobile device can be implemented (e.g. process 1200 provided infra). One example method of determining the type of user agent can include implementing process 1100 of FIG. 11.

Figure 11:
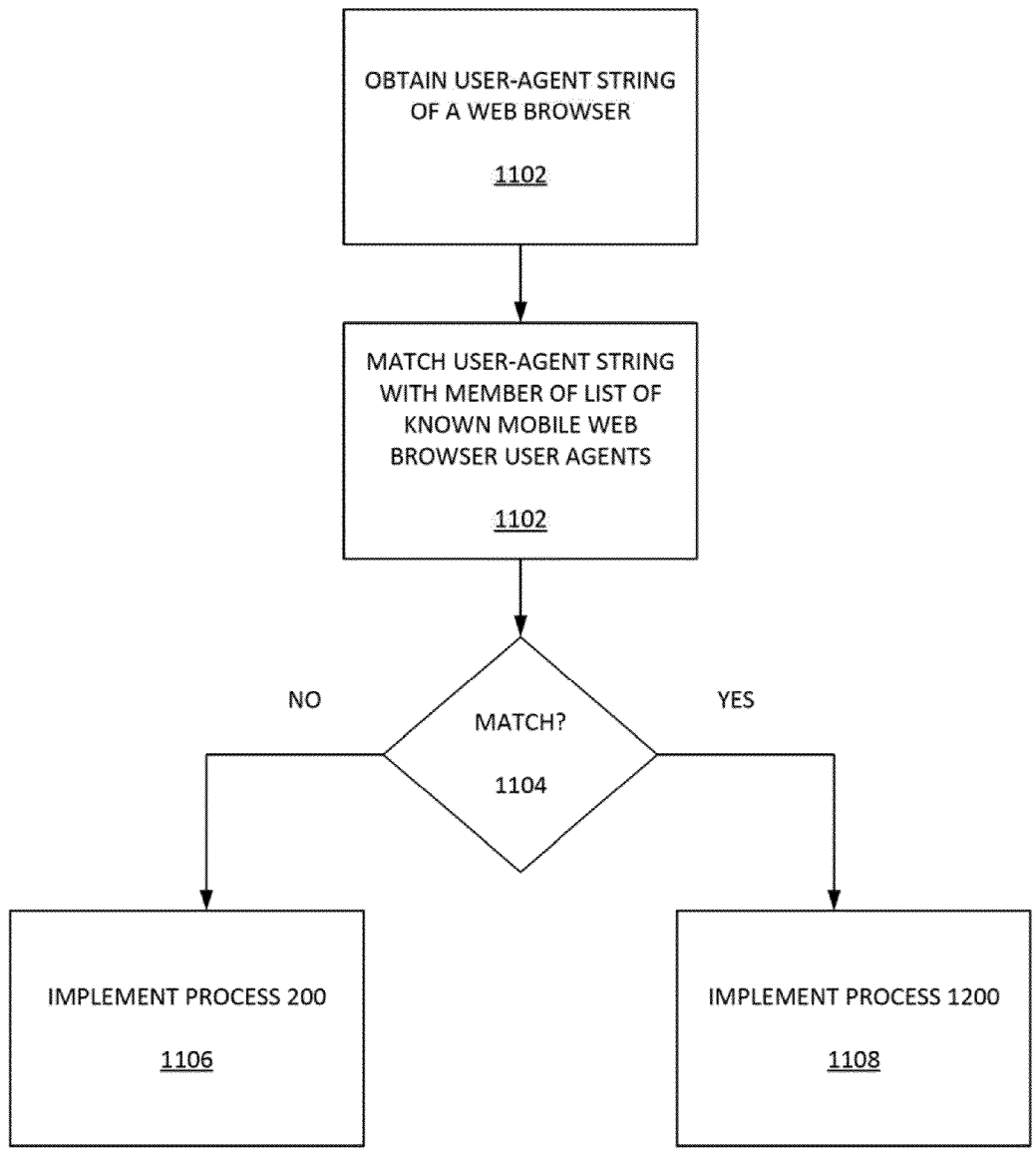
FIG. 11 depicts an example process for determining a type of user agent used to access an authentication page, according to some embodiments.

FIG. 11 depicts an example process 1100 for determining a type of user agent used to access an authentication page, according to some embodiments. In step 1102, a user-agent string of a web browser can be obtained. The user-agent string can be obtained, for example, using a JavaScript library to copy the web browser's User-Agent header field. In step 1104, the user-agent string can be searched for a match to a list of known mobile-web browser user agents. In step 1106 it is determined if a match is found or not found. If a match is not found, process 200 can be implemented in 1108. If a match is found then process 1200 (see infra) can be implemented in step 1110. It is noted that in other example embodiments, steps 200 and/or 1200 can be replaced with other processes of interpolating advertisements, web pages and/or other messages prior to allowing the user-agent access to a captive portal's authentication page.

Figure 12:
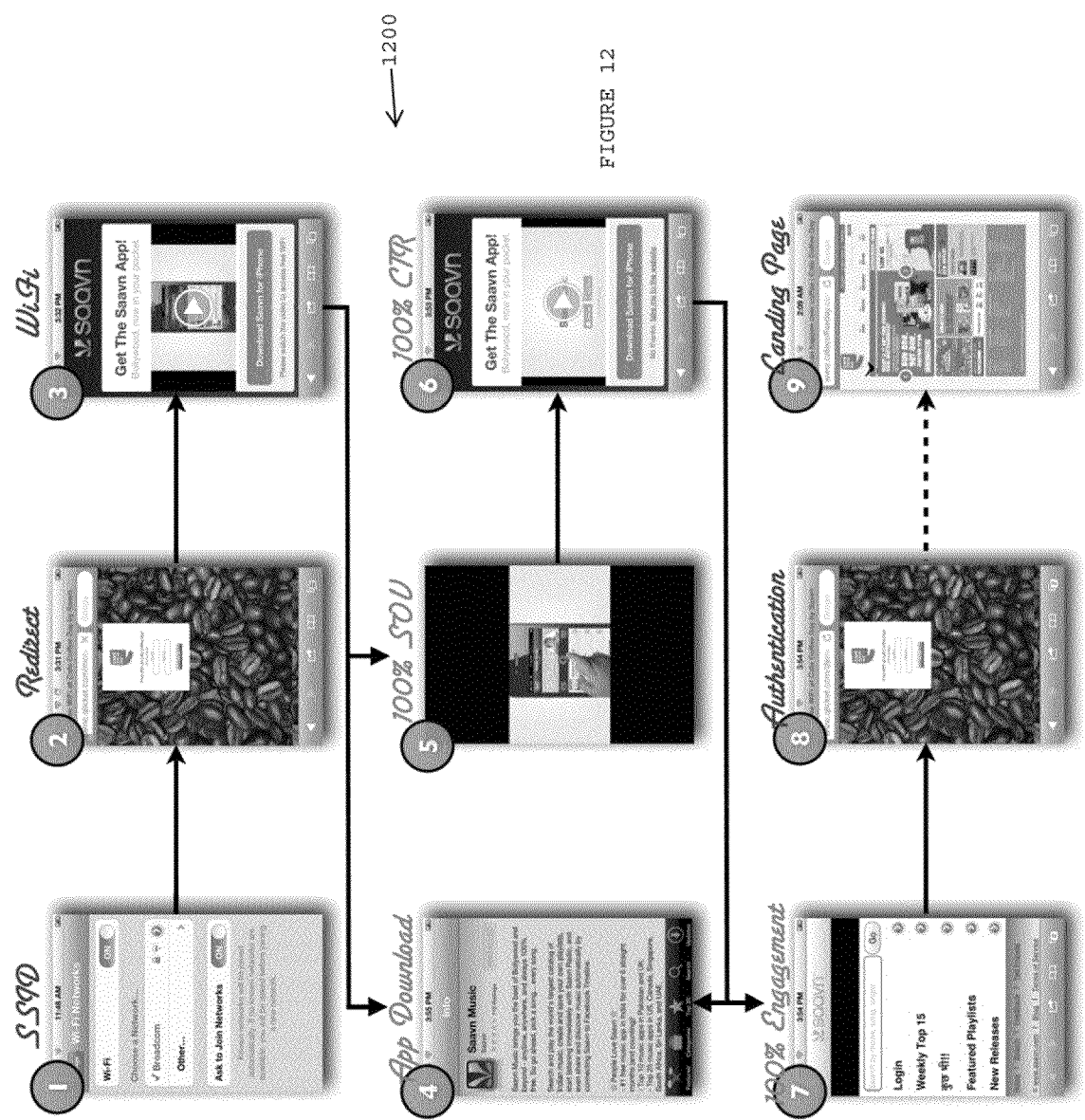
FIG. 12 provides a series of use-case screen shots to depict an example process of presenting an interstitial advertisement to a captive-portal mobile client, according to some embodiments.
Figure 13:
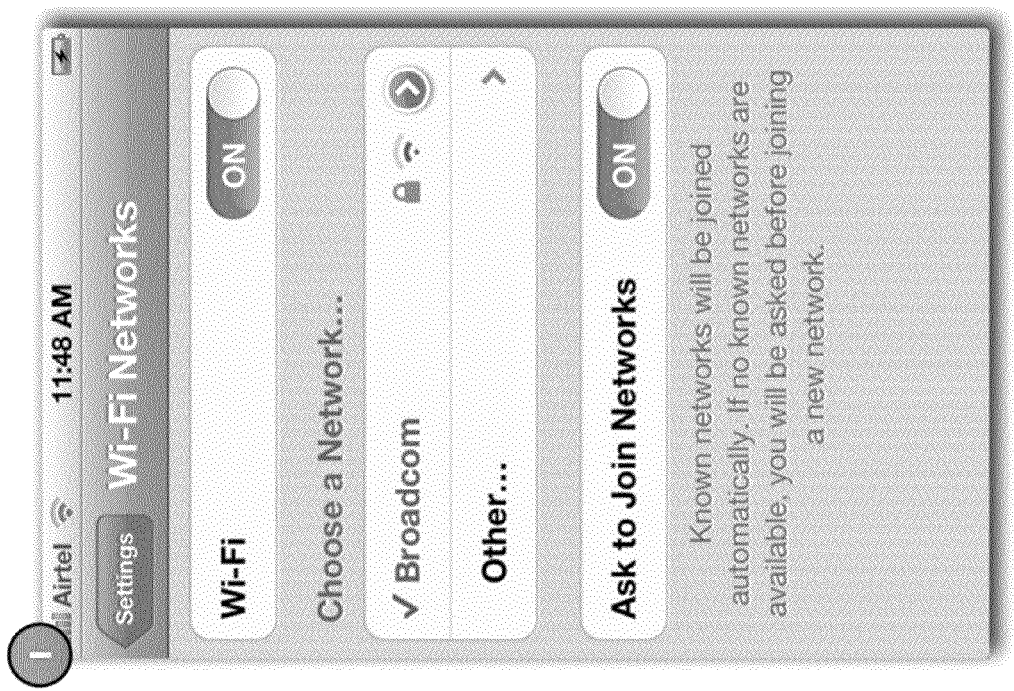
FIG. 13 depicts an example of a user selecting an SSI of a partner WLAN with a mobile device, according to some embodiments.
Figure 14:
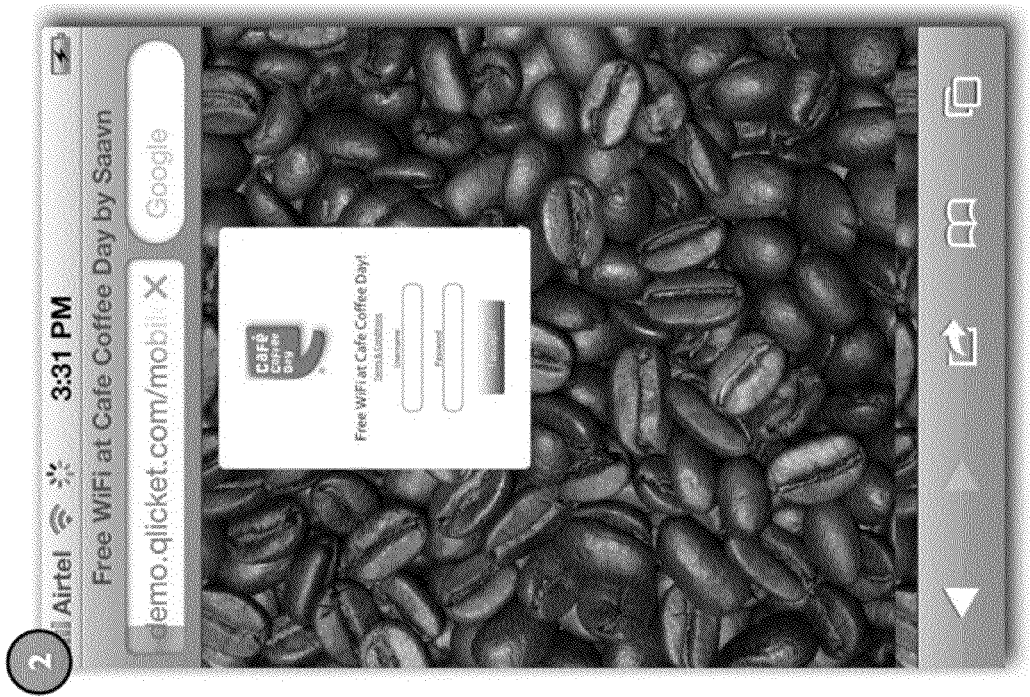
FIG. 14 depicts an example of a mobile-device oriented captive portal's authentication web page, according to some embodiments.

FIG. 12 provides a series of use-case screen shots to depict an example process 1200 of presenting an interstitial advertisement to a captive-portal mobile-device client, according to some embodiments. Process 1200 can be described with a discussion of FIGS. 13-21. FIG. 13 illustrates an example of step 1 of process 1200. In step 1, a user can select internet access over a WLAN through the use of a router connected to a link to an ISP. For example, a user can select, an SSID of a WLAN provided by a third-party enterprise such as a partner corporation of an entity that provides the advertisements. The WLAN can implement a captive portal technique. In this particular example, the user selects 'Broadcom' with a mobile web browser. The WLAN router can determine that the MAC address of the mobile device has not been authenticated and then redirect the mobile-device client to an authentication web page. The authentication web page can include instructions such as a JavaScript snippet/code integrated in the captive portal's authentication web page. The JavaScript code can detect that the web browser is operating in a mobile device. The JavaScript code can then rewrite the URL in the address bar of the web browser to a mobile-oriented authentication page (e.g. sized to fit in a mobile device's display parameters). Thus, in step 2 of process 1200 the mobile-oriented authentication page is displayed with the mobile device client as shown in FIG. 14.

Figure 15:
FIG. 15 depicts an example of a white-listed advertiser's web page accessed through automatic redirection of a mobile-device's web browser from an authentication web page, according to some embodiments.
Figure 16:
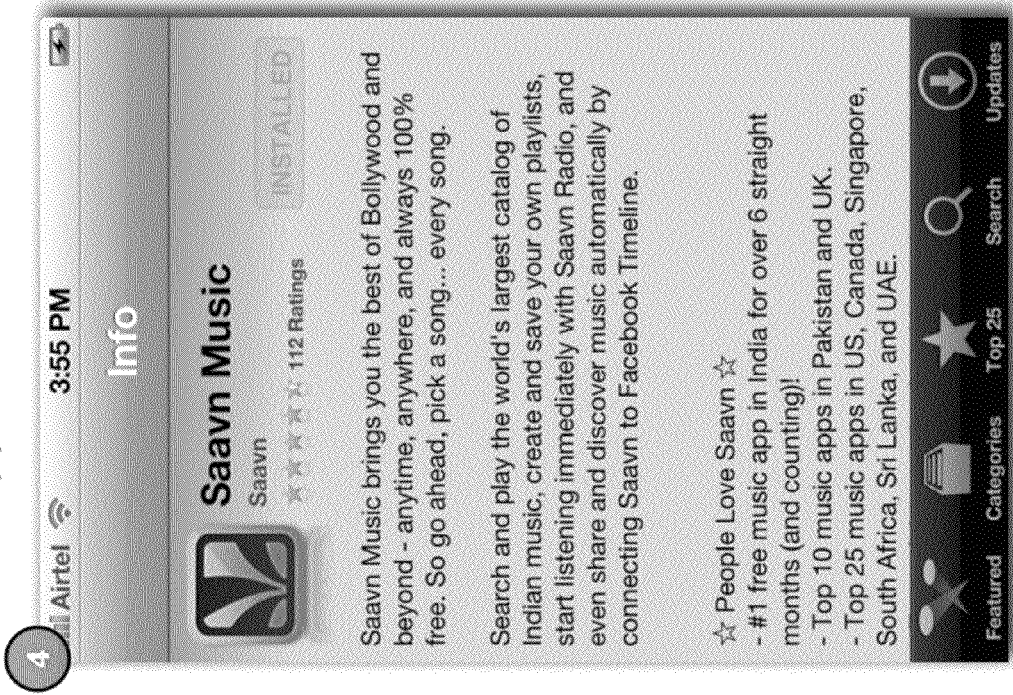
FIG. 16 illustrates an example web page (e.g. a web page running inside a native application such as iTunes® store) providing an advertiser's mobile application, according to some embodiments.
Figure 17:
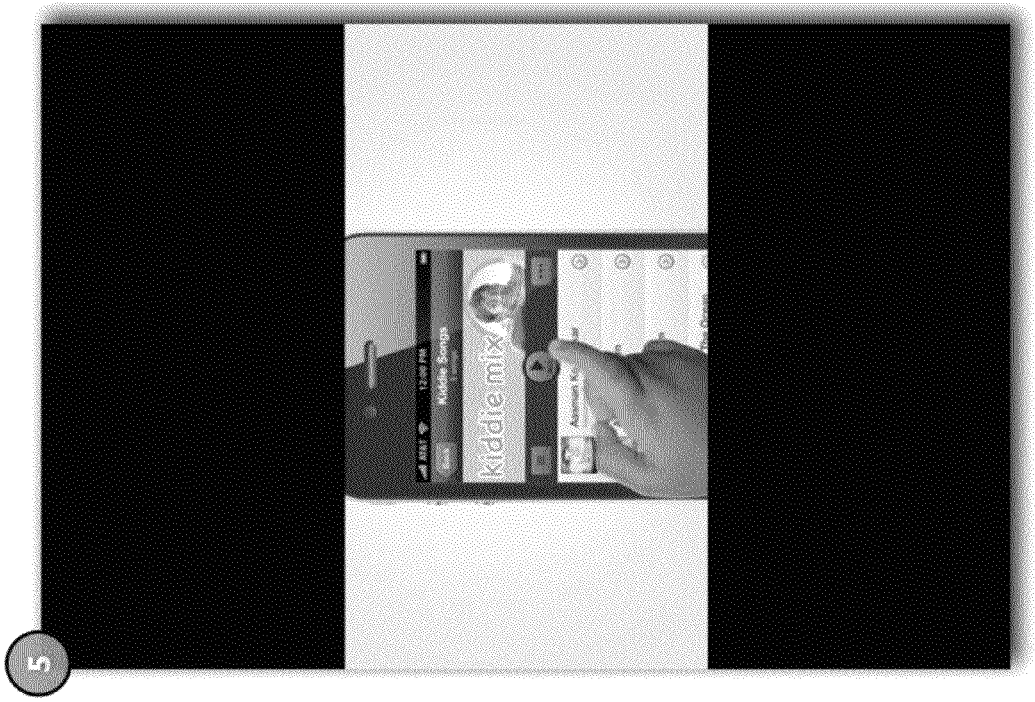
FIG. 17 depicts an example of an advertisement video played with an RTSP protocol on a mobile device, according to some embodiments.
Figure 18:
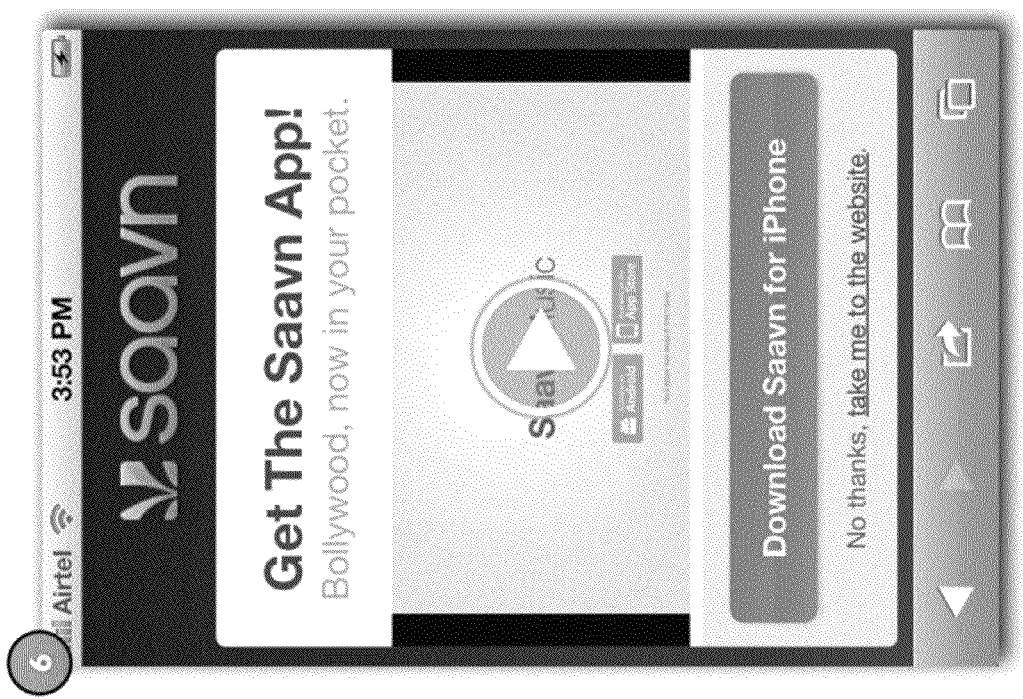
FIG. 18 illustrates an advertiser's custom web page on a mobile display after the advertiser's video has been played, according to some embodiments.
Figure 19:
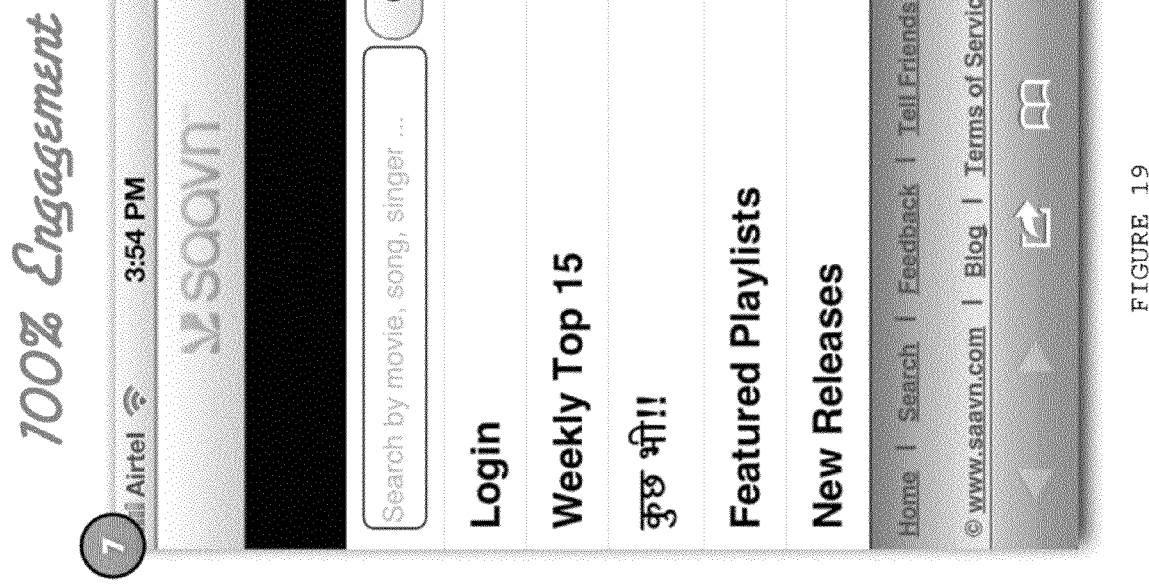
FIG. 19 illustrates an advertiser's mobile web page on a mobile display after the advertiser's video has been played, according to some embodiments.
Figure 20:
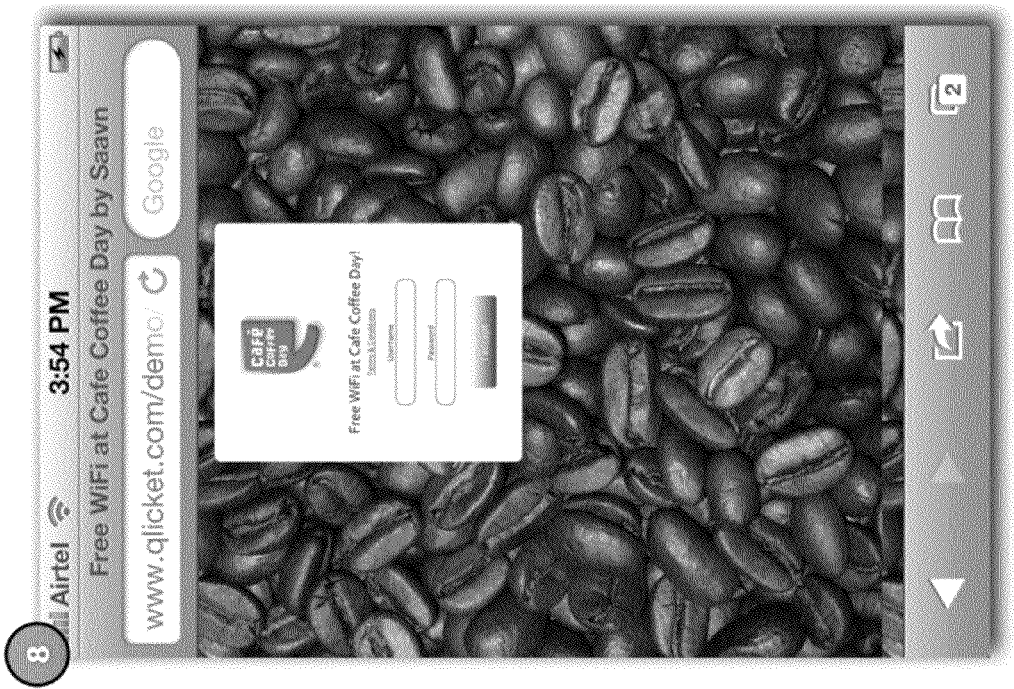
FIG. 20 depicts an example of a mobile-device oriented captive portal's authentication, web page, according to some embodiments.
Figure 21:
FIG. 21 illustrates an example of a mobile-oriented captive-portal landing page, according to some embodiments.

In step 3 of process 1200, the JavaScript code integrated into the mobile-oriented authentication web page can then redirect the mobile web browser to an advertiser's custom web page as designed for the particular advertiser, as shown in FIG. 15. FIG. 15 depicts a mobile-version of the advertiser's custom web page prior to playing the advertisement video to the user. In the mobile context, the advertisement video can be accessed using RTSP. Accordingly, the user can press the virtual play button and the advertising video is played as shown by step 5 of process 1200 depicted in FIG. 17. It is noted as well, that the advertiser's custom web page can be whitelisted. In this way, a user can also choose to access the advertiser's application download page in step 4 of process 1200 depicted in FIG. 16. FIG. 18 illustrates the advertiser's custom web page after the video has been played in step 6 of process 1200. It is noted that the user is presented with an option to download the advertiser's application and/or navigate back to the captive portal's authentication web page. In step 7 of process 1200, as depicted in FIG. 19, a user can navigate (or be redirected) to other whitelisted advertiser web pages such as a mobile version of the advertiser's website. In step 8 of process 1200, as depicted in FIG. 20, the captive portal's authentication webpage is accessed after the video advertisement has been played and the user has navigated (or been redirected) to other whitelisted advertiser webpages. The user is then, provided an opportunity to log into the hotspot service and reach a landing page as provided in step 9 of process 1200 as depicted in FIG. 21. It is noted that the redirection to the advertiser's webpage can happen on a pre-authorized basis (as depicted in this instance). For example, at the bottom right of FIG. 20, two window frames have been opened. The advertiser's mobile webpage was open per a pre-authorization as it is whitelisted. However, if an advertiser doesn't pay for pre-authorization, then, alternatively, a plurality of open multiple landing pages can be accessed on a post-authorization basis. It is noted that the redirection to the advertiser's webpage can happen on a pre-authorized basis in this instance. For example, at the bottom right of FIG. 20, two window frames have been opened. The advertiser's mobile webpage was opened per a pre-authorization at it is whitelisted. However, if an advertiser doesn't pay for pre-authorization, then, alternatively, a plurality of open multiple landing pages can be accessed on a post-authorization basis.

Figure 22:
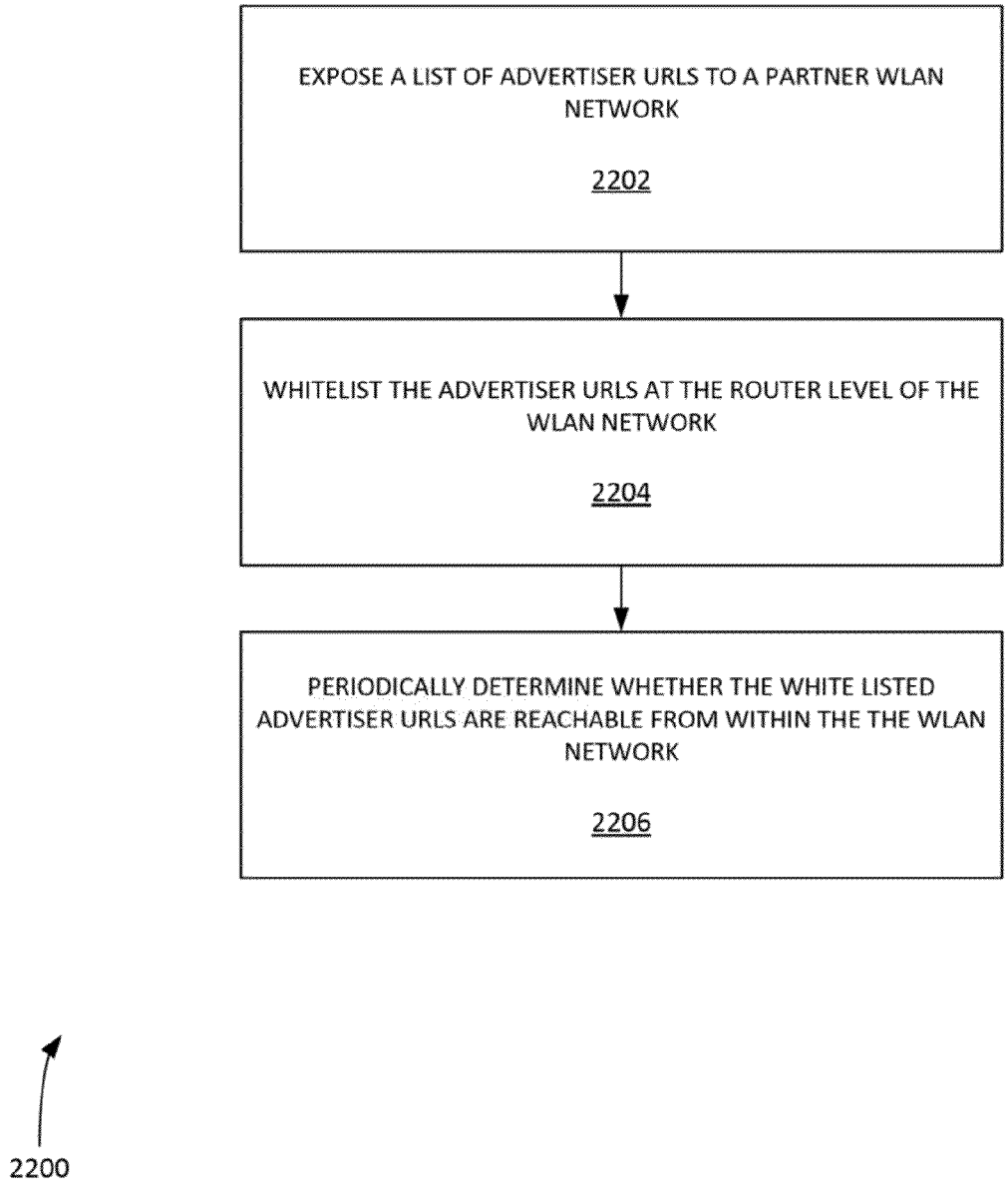
FIG. 22 illustrates an example process of 'whitelisting' a set of advertiser URLs at the router level of a partner WLAN, according to an example embodiment.

FIG. 22 illustrates an example process 2200 of whitelisting a set of advertiser uniform resource locator strings ('URLs') at the router level of a partner WLAN, according to an example embodiment. It is noted that while this particular embodiment utilizes advertiser URLs, other entity-type URLs may be available in other example embodiments. In step 2202, a list of advertiser URLs is exposed (e.g. with a representational state transfer (REST) API or other HTTP-based API) to a partner WLAN. In one example, the advertiser URLs can be provided as a JavaScript Object Notation (JSON) or Extensible Markup Language (XML) document. In step 2204, the advertiser URLs can be 'whitelisted' at the router level of the WLAN. Whitelisting can include granting a user agent that has not yet been authenticated by the captive portal access to the listed URLs (e.g. a walled garden feature that allows free access to certain web sites). For example, a web browser requesting a web page from a whitelisted URL would not be redirected to the authentication page and/or interstitial advertisements. In step 2206, it is periodically determined whether the whitelisted advertiser's URLs are reachable from within the WLAN. For example, a local server coupled with the WLAN and operated by the advertisement management entity (e.g. the same entity that provides the advertiser URLs) can algorithmically determine whether the advertiser URLs are reachable from within the WLAN by an authenticated user agent.

Figure 23:
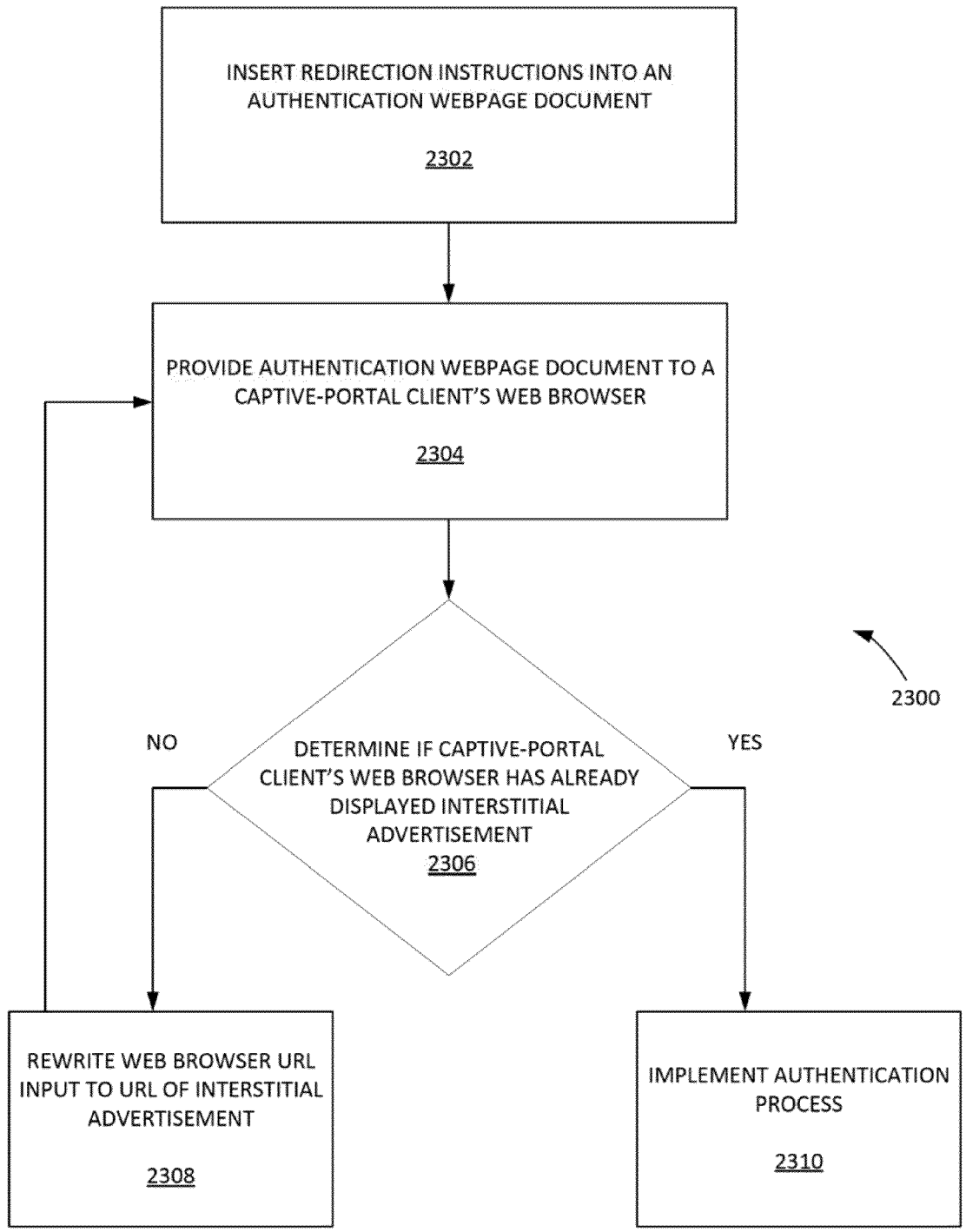
FIG. 23 illustrates an example process of client-side redirection of a captive-portal client's web browser, according to an example embodiment.

FIG. 23 illustrates an example process 2300 of client-side redirection of a captive-portal client's web browser, according to an example embodiment. In step 2302, a redirection instruction can be inserted into an authentication web page document. In one example, the instructions can be provided as a JavaScript library written into the authentication web page document. It is noted that the JavaScript library can include instructions to obtain other parameters such as screen width, screen height, user agent, IP address, platform details, and the like. The JavaScript library can provide these parameters to an advertisement management server.

In step 2304, the authentication web page document is provided to a captive-portal client's web browser. For example, a client device can connect with a local hotspot. The hotspot can implement a captive-portal technique such that the client device's web browser is redirected to a web server that provides an authentication web page in order to log into the Internet service (assuming the user agent's MAC address does not appear on a list of authenticated MAC addresses). In step 2306, it is determined whether the captive portal client's web browser has already displayed the interstitial advertisement (e.g. the JavaScript library can locate the cookie). If the determination is 'yes', then an authentication process can be implemented in step 2310. The authentication process can include a payment option using credit card, PayPal®, iPass®, or other payment service.

If the determination is 'no', then the client can be redirected to the interstitial advertisement. In step 2308, the redirect instructions in the JavaScript library can rewrite the address bar's URL to that of an interstitial advertisement. The web browser can then implement a fresh request for a new web page when it detects a change in the URL value of the address bar. In one example, the interstitial advertisement can lock the client's web browser until an advertisement video is completely played. The client's web browser can receive a cookie upon completion of the advertisement. Process 2300 then returns the client's web browser to step 2304. For example, the interstitial web page (e.g. whether an inline frame for desktop/laptop devices or a separate mobile page for mobile devices) can then implement a redirection back to the URL designated in the JavaScript snippet/code integrated in the captive portal's authentication web page. This URL can be that of the authentication page.

Thus, process 2300 can ensure that an advertisement is displayed to a user before the user can access an authentication web page of a hotspot. It is noted that the JavaScript library can provide various parameters obtained about the device to an advertisement management server. The advertisement management server can select, an advertisement according to the received parameters (e.g. match with display-screen parameters, according to IP address location, hotspot category, etc.) and communicate relevant information to the JavaScript client (e.g. a URL associated with the advertisement and/or the identity of the selected advertisement, etc.).

Figure 24:
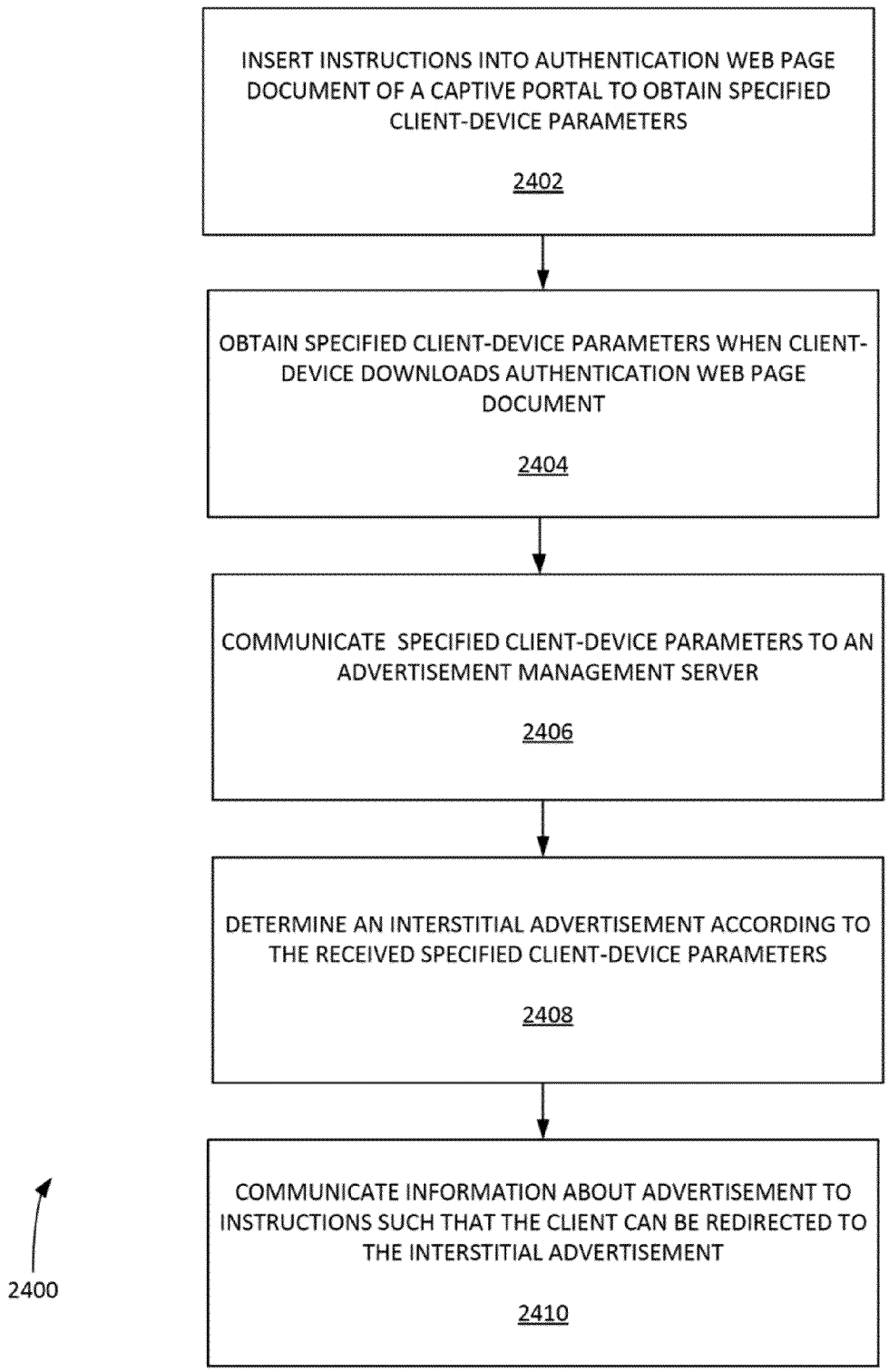
FIG. 24 illustrates an example process of provisioning an interstitial advertisement to a captive-portal client, according to some embodiments.

FIG. 24 illustrates an example process 2400 of provisioning an interstitial advertisement to a captive-portal client, according to some embodiments. In step 2402, a set of instructions to obtain specified client-device parameters are inserted into a captive-portal's authentication page. A client-device can be any device (e.g. mobile device, tablet computer, laptop, etc.) that can access the Internet through a WLAN. The instructions can be provided as a JavaScript snippet/code written into the authentication web page document. The specified parameters can include screen width, screen height, user agent, IP address, platform details, and the like. Thus, in step 2404, the specified client-device parameters are obtained when client device downloads the authentication web page document. The specified client-device parameters are then communicated to an advertisement management server is step 2406. In step 2408, the advertisement management server determines an interstitial advertisement according to the received specified client-device parameters. For example, a set of advertisements can be selected that are relevant to the location of the WLAN (e.g. ads for restaurants and other shops in the geographical proximity of the WLAN). The format of interstitial, advertisements can also be determined according to the display parameters of the client device. In this way, a list of relevant interstitial advertisements can be generated. In some embodiments, the advertisement management server can randomly select from the advertisements in the list. In step 2410, the advertisement management server can communicate information about the interstitial advertisement to the instructions client (e.g. the JavaScript snippet/code) so that the client-device's web browser can be redirected to the interstitial advertisement.

Exemplary Environment and Architecture

Figure 25:
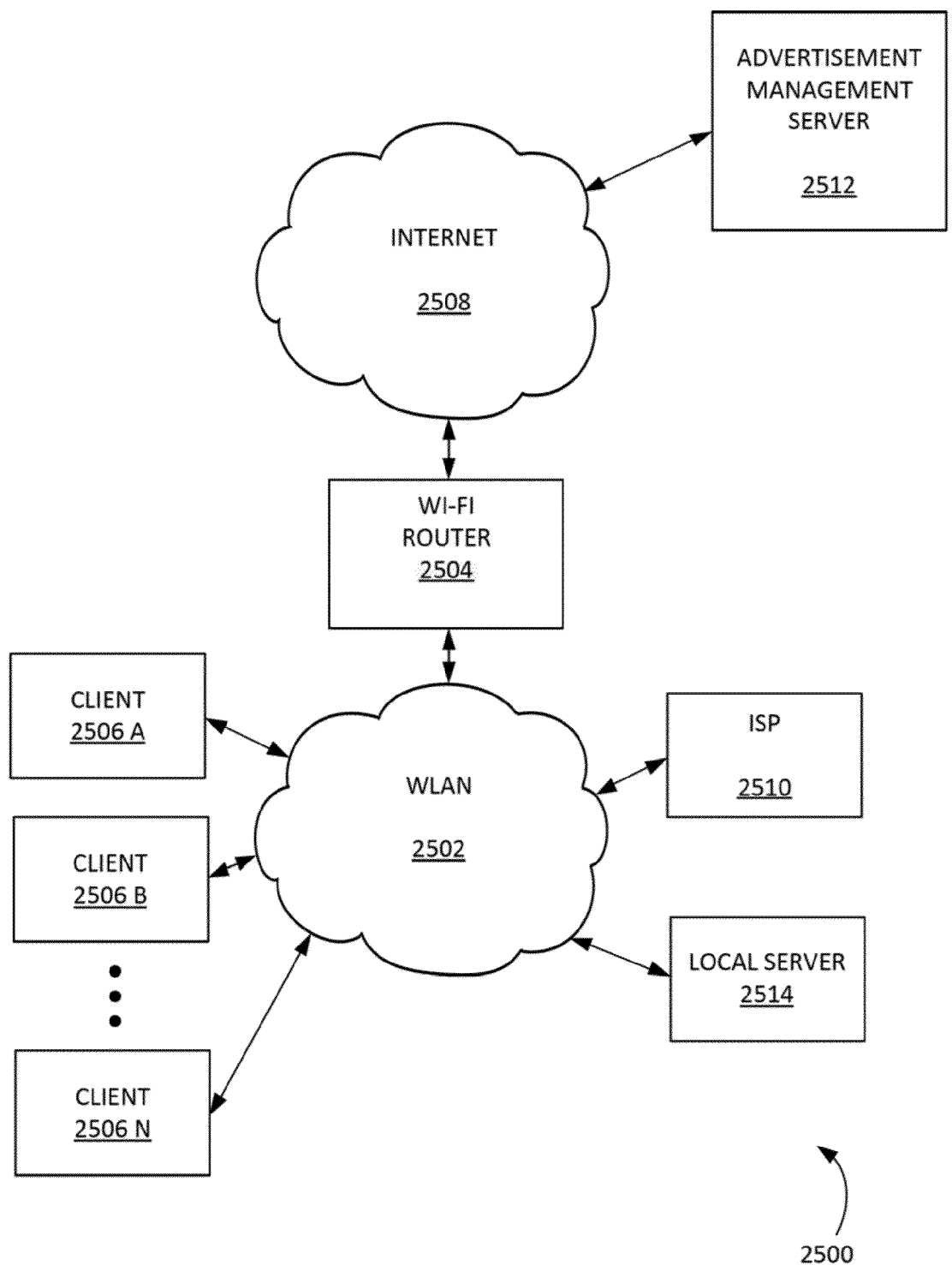
FIG. 25 depicts an architecture block diagram for an example captive-portal advertisement system, according to some embodiments.

FIG. 25 depicts an architecture block diagram of an example captive-portal advertisement system 2500, according to some embodiments. System 2500 can include WLAN 2502. WLAN 2502 can be a hotspot (e.g. a Wi-Fi access point or area for connecting to the Internet 2508) provided and managed by Internet service provider (ISP) 2510. Clients 2506 A-N can typically be web browsers that access Internet 2508 via WLAN 2502 and ISP 2510. Clients 2506 A-N can include web browsers. ISP 2510 can implement a captive portal in WLAN 2502 to ensure authentication of users of clients 2506 A-N. The captive portal can further include the presentation of advertisements to clients 2506 A-N prior to initiating the authentication and/or payment process. In some examples, the advertisements can be interstitial web pages (e.g. inline frames that include a video) if a client is a desktop-type device. In other examples, the advertisement can be a video provided via an RTSP protocol if the client is a mobile device client. Various techniques can be utilized by ISP 2510 to redirect clients 2506 A-N from the captive portal's authentication web page to advertisements such as client-side redirection, whitelisting of advertiser web pages at the WLAN's router level, caching of advertisement media content from within the WLAN, and the like. It is noted that the captive portal technique can be implemented at the router level of the WLAN as well. Router level operations can be performed by Wi-Fi router 2504. Wi-Fi router 2504 can maintain an authenticated list of previously authenticated MAC addresses.

Local server 2514 can implement caching of advertisement media content from within the WLAN. For example, local server 2514 can serve video advertisements via HTTP and/or RTSP locally from within the WLAN. Local server 2514 can synchronize and download its media content from advertisement management server 2512. This process can occur during periods when the WLAN's user traffic is ascertained to be low. The media content can be determined by the categorization of the WLAN and categorization of the campaigns (e.g. by location and/or local business entities who provide advertisements). For example, certain advertisements can be associated with certain IP addresses. Advertisement management server 2512 can match the incoming WLAN IP address with an advertisement associated with it. Advertisement management server 2512 can then replace the URL of the interstitial advertisement with the IP address of local server 2514 so that the video can be served locally.

In one example, local server 2514 can be a local caching device that can have a small form factor computer (e.g. ITX such as Mini-ITX, Nano-ITX, Pico-ITX, Mobile-ITX) with an x86 based microprocessor 32 or 64 bit, at least about 2 GB of RAM and a solid state drive of at least 60 GB or greater. The local caching device can also include at least one Ethernet port through which it can connect to the Wi-Fi router directly and/or to a computer network to which the Wi-Fi router is connected. The local caching device can cache multimedia objects (such as video, audio, flash files and the like) locally. To achieve this, the local caching device can be on the same subnet as the WLAN network. In one example, advertisement management server 2512 can include information about which hotspots have such a local caching device deployed locally (e.g., by IP address). As soon as an advertisement management server 2512 receives a request for an advertisement from such a hotspot, it can serve the relevant page with the URL of such files set to the local NAT IP address of this device. For example, if a hotspot's IP address is 118.75.200.118 as known to an advertisement management server 2512 and the internal network address translation (NAT) IP address of the local caching device is 192.168.1.254; then, instead of serving the advertisement page with the resource's URL as <video src="some/path/to/resource.mp4"> advertisement management server 2512 can serve the URL as <video scr="http://192.168.1.254/path/to/resource.mp4">.

Figure 26:
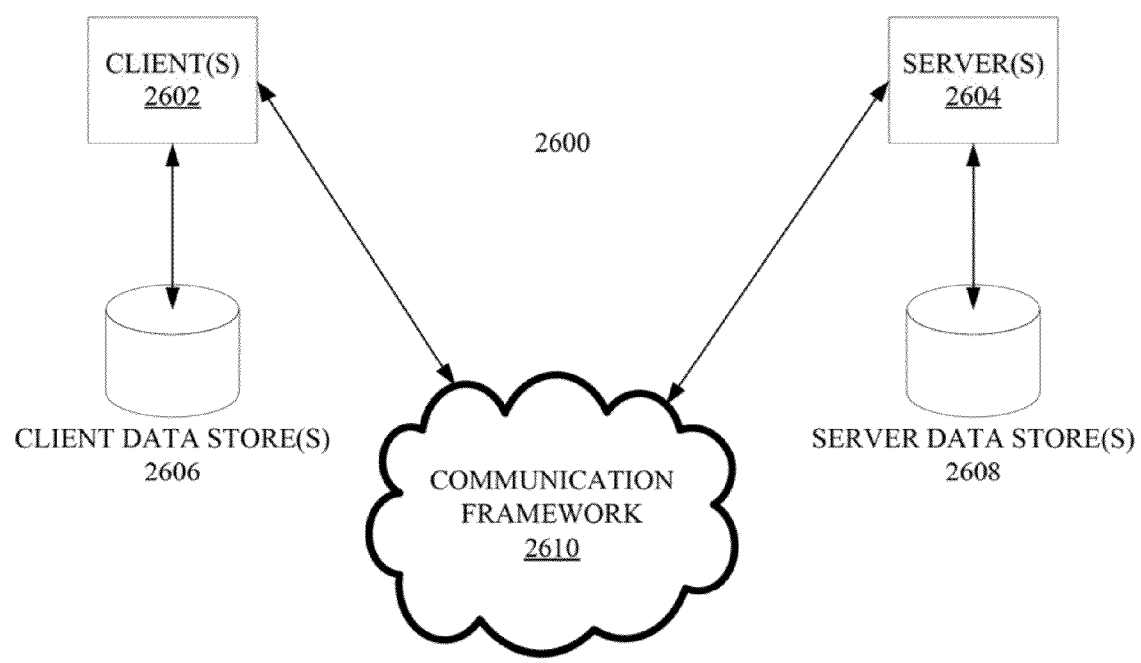
FIG. 26 is a block diagram of a sample computing environment that can be utilized to implement some embodiments.

FIG. 26 is a block diagram of a sample-computing environment 2600 that can be utilized to implement some embodiments. The system 2600 further illustrates a system that includes one or more client(s) 2602. The client(s) 2602 can be hardware and/or software (e.g., threads, processes, computing devices). The system 2600 also includes one or more server(s) 2604. The server(s) 2604 can also be hardware and/or software (e.g., threads, processes, computing devices). One possible communication between a client 2602 and a server 2604 may be in the form of a data packet adapted to be transmitted between two or more computer processes. The system 2600 includes a communication framework 2610 that can be employed to facilitate communications between the client(s) 2602 and the server(s) 2604. The client(s) 2602 are connected to one or more client data store(s) 2606 that can be employed to store information local to the client(s) 2602. Similarly, the server(s) 2604 are connected to one or more server data store(s) 2608 that can be employed to store information accessible by the server(s) 2604.

In some embodiments, system 2600 can be included and/or be utilized by the various systems and/or methods described herein to implement processes 100, 200, 1200, 2200, 2300, 2400, 2800, 3000 and system 2500.

Figure 27:
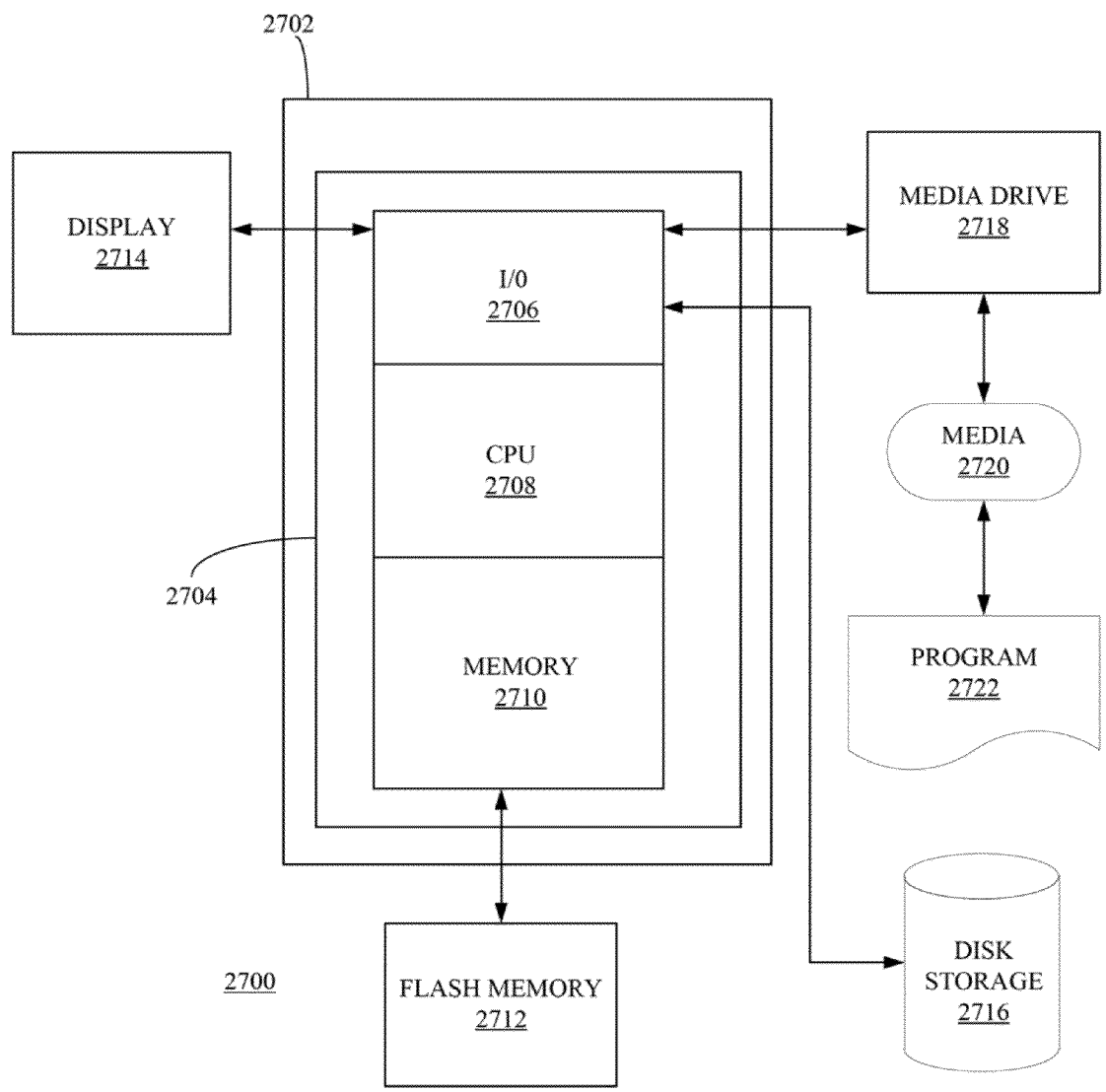
FIG. 27 depicts an exemplary computing system with a number of components that may be used to perform any of the processes described herein.

FIG. 27 depicts an exemplary computing system 2700 that can be configured to perform any one of the processes provided herein. In this context, computing system 2700 may include, for example, a processor, memory, storage, and I/O devices (e.g., monitor, keyboard, disk drive, Internet connection, etc.). However, computing system 2700 may include circuitry or other specialized hardware for carrying out some or all aspects of the processes. In some operational settings, computing system 2700 may be configured as a system that includes one or more units, each of which is configured to carry out some aspects of the processes either in software, hardware, or some combination thereof.

FIG. 27 depicts computing system 2700 with a number of components that may be used to perform any of the processes described herein. The main system 2702 includes a motherboard 2704 having an I/O section 2706, one or more central processing units (CPU) 2708, and a memory section 2710, which may have a flash memory card 2712 related to it. The I/O section. 2706 can be connected to a display 2714, a keyboard and/or other user input (not shown), a disk storage unit 2716, and a media drive unit 2718. The media drive unit 2718 can read/write a computer-readable medium 2720, which can contain programs 2722 and/or data. Computing system 2700 can include a web browser. Moreover, it is noted that computing system 2700 can be configured to include additional systems in order to fulfill various functionalities.

Additional Exemplary Processes and Use Cases

Figure 28A:
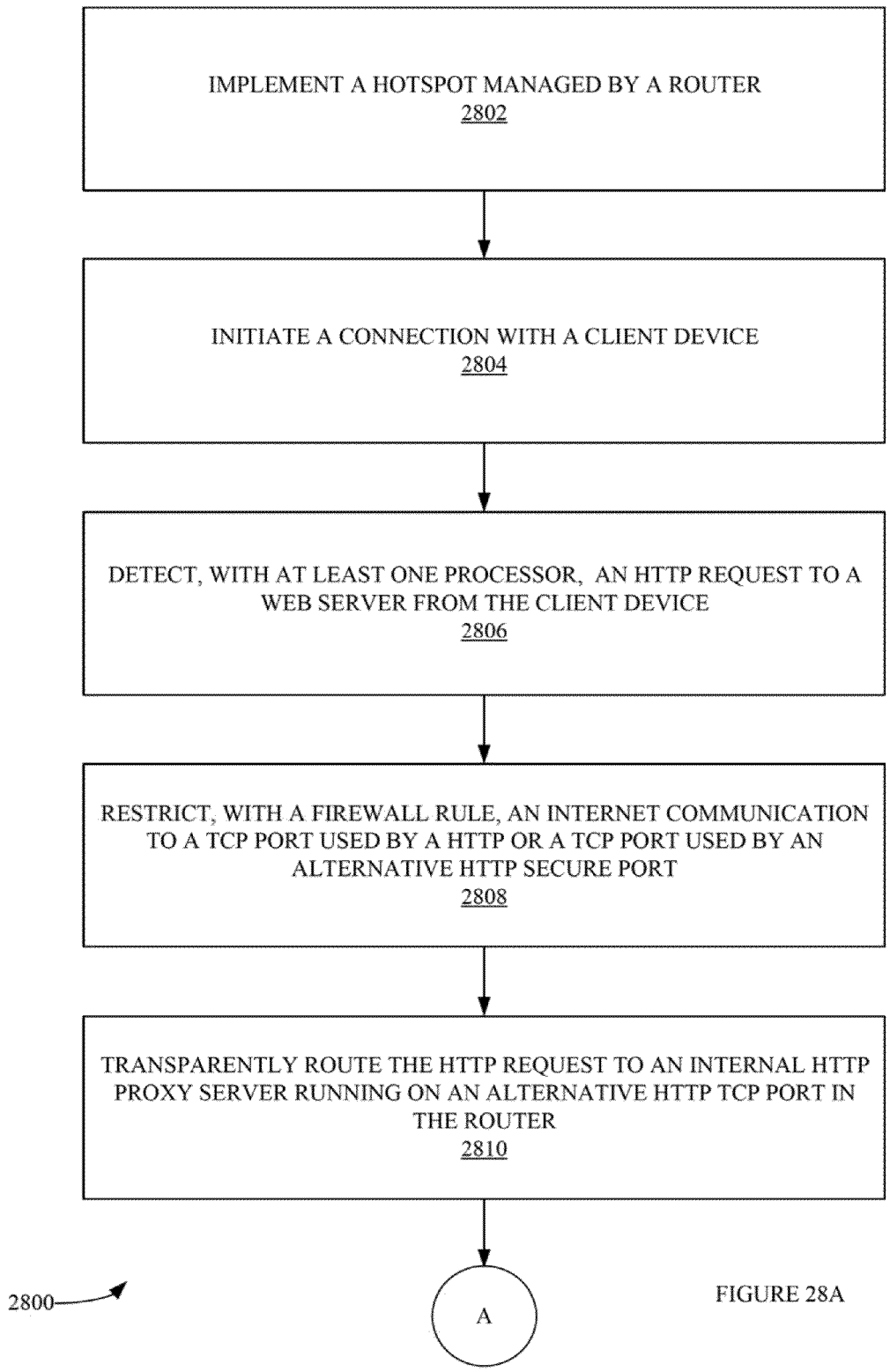
FIGS. 28 A-B illustrate an example process of providing a captive portal with a router, according to some embodiments.
Figure 28B:
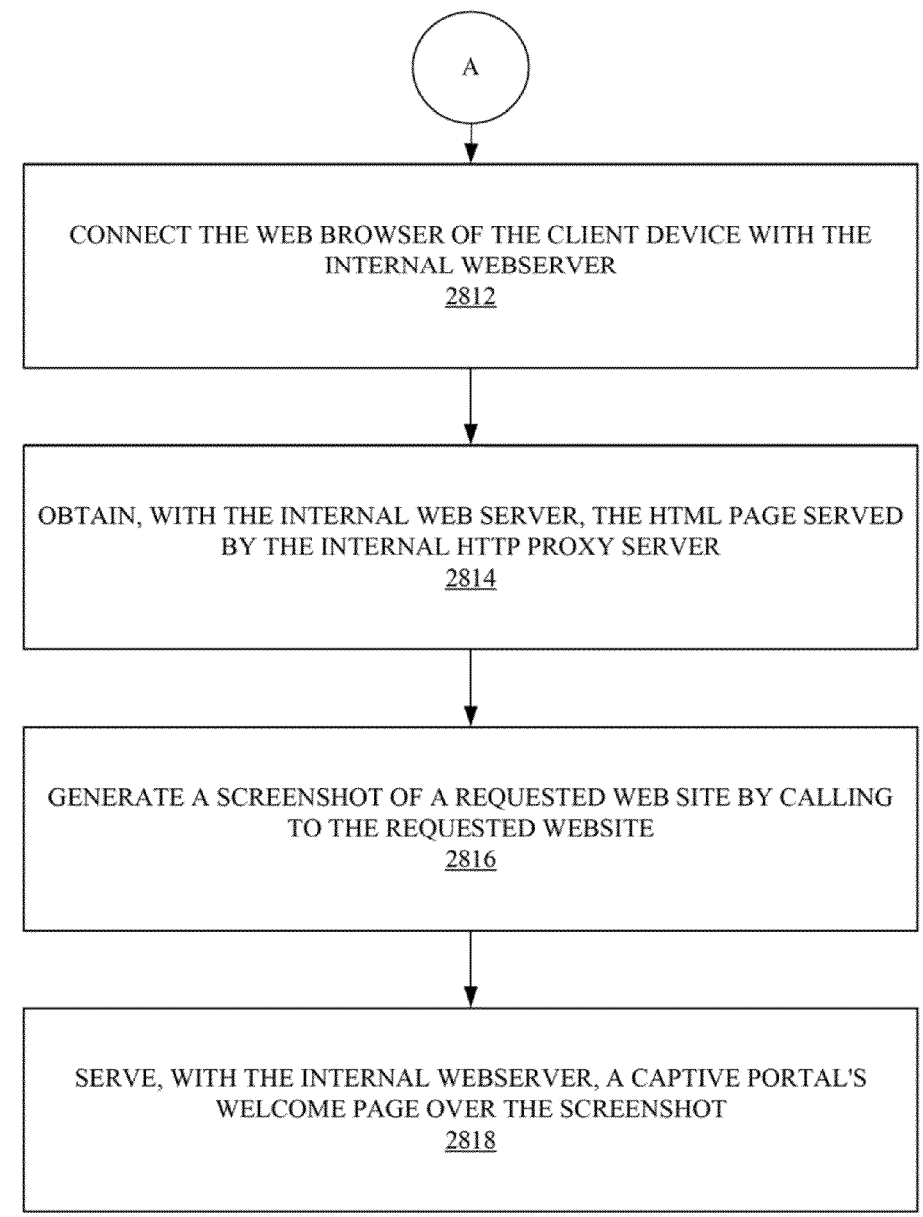

FIGS. 28 A-B illustrate an example process 2800 of providing a captive portal with a router, according to some embodiments. In step 2802 of process 2800 a hotspot managed by a router is implemented. The hotspot can include an Internet-access over a WLAN through a router. The router can be communicatively coupled with one or more Internet service providers. The router can be a device that forwards data packets between computer networks. The WLAN can be identified with a service set identifier (SSID). In step 2804, a connection can be initiated with a client device (e.g. a mobile device, a lap top computer, etc.). In step 2806, the router can detect, (e.g. using at least one processor) an HTTP request to a web server from the client device. In step 2808, an internet communication (e.g. from the client device) is restricted to a Transmission Control Protocol (TCP) port used by a Hypertext Transfer Protocol (HTTP) or a TCP port used by an alternative HTTP Secure port. For example, the TCP port used by the HTTP protocol communications can be TCP port 80, and the TCP port used by an alternative HTTP Secure port communications can be TCP port 8443. In step 2810, the HTTP request (and/or other Internet communication such as a HTTPS request) can be transparently routed to an internal HTTP proxy server running on an alternative HTTP TCP port in the router. The internal HTTP proxy server can determine a requested web site's uniform resource locator (URL), as well as, determine whether the requested web site's URL is allowed into a walled garden maintained by the router. The router can serve a light HyperText Markup Language (HTML) web page that redirects the client device's web browser to an internal web server where the captive portal is hosted when the requested web site's URL is not allowed into the walled garden. The walled garden can include a software system where the carrier or service provider has control over applications, content, and media and restricts convenient access to non-approved applications or content. The router can route a request for the requested web site's URL by the client device's web browser to an internal web server associated with the requested web site's URL when the requested web site's URL is allowed into the walled garden. In step 2812, the client device's web browser is connected with the internal webserver. In step 2814, the HTML page served is obtained by the internal HTTP proxy server. The HTML page can be served to the web browser by the internal web server of the router. In step 2816, a screenshot of a requested web site is generated (e.g. Internal web server) by calling to the requested website. In step 2818, a captive portal's welcome page is served (e.g. with the internal webserver) over the screenshot (e.g. see FIG. 29 infra). Transparent routing can be when a client device requests a web server such as 'google.com', the router changes the source address of the request packet from the IP address of the actual web server as resolved by DNS to the IP address of the router itself so that the packet is routed to the web proxy server running locally on the router. This can be performed using the networking stack where the destination IP address of the request packet is changed to be the router's local IP address.

Figure 29:
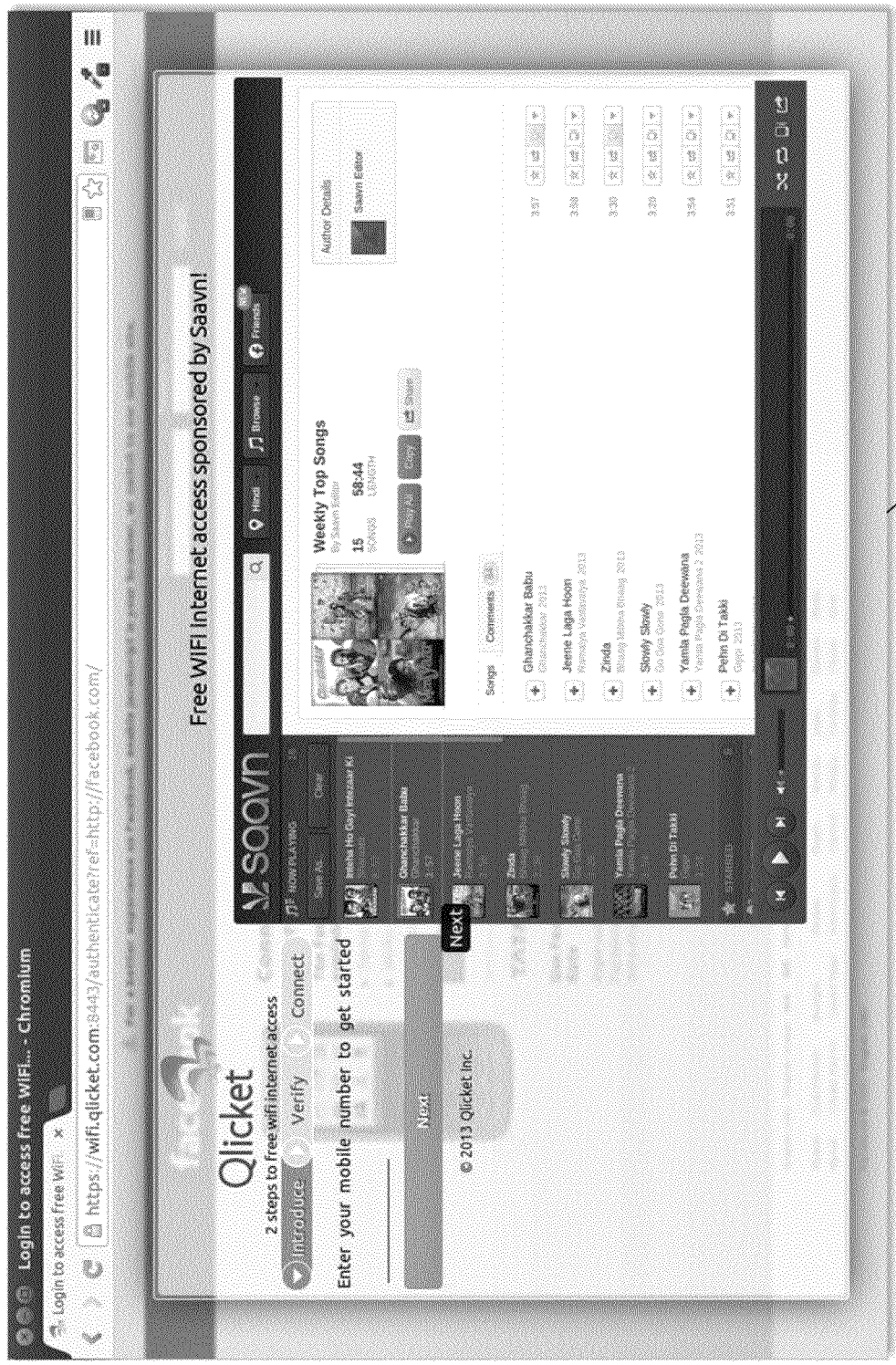
FIG. 29 illustrates an example of a captive portal's welcome page, according to some embodiments.

FIG. 29 illustrates an example of a captive portal's welcome page 2900, according to some embodiments. The captive portal's welcome page 2900 can include an opaque lightbox image layered over a screenshot of a web page recently requested by a user of a web browser. Process 2800 can be utilized to generate captive portal's welcome page 2900. Captive portal's welcome page 2900 can include advertisements (not shown) such as digital video advertisements to be played to the user. Various portions of captive portal's welcome page 2900 (e.g. the web page retrieved by an internal web server in the router) can be blurred by functionalities in the captive portal's router and sent to the user's web browser for display in a blurred manner.

Figure 30:
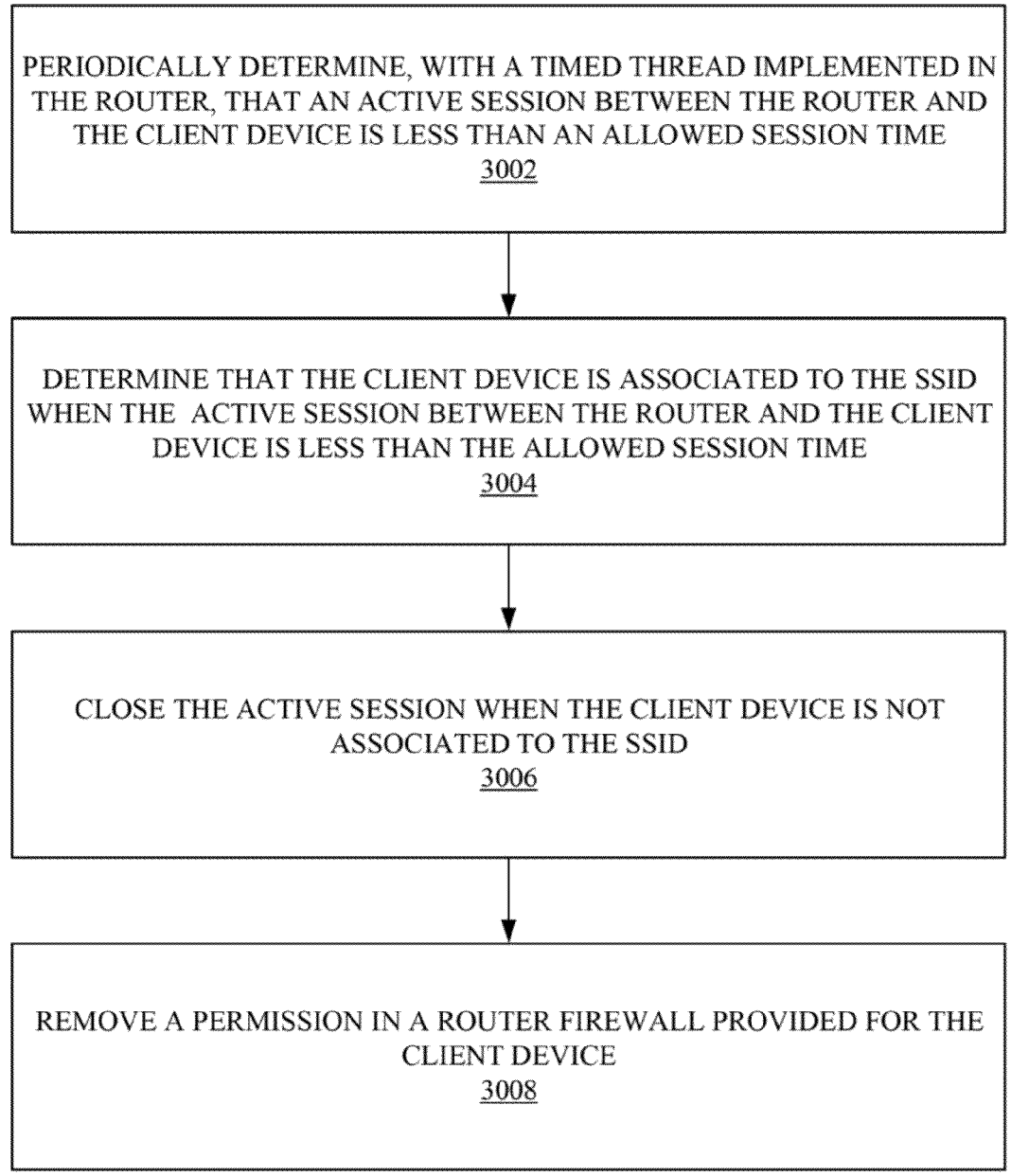
FIG. 30 illustrates a process of monitoring internal sessions of a router, according to some embodiments.

FIG. 30 illustrates a process 3000 of monitoring internal sessions of a router, according to some embodiments. In step 3002 of process 3000, it is periodically determined (e.g. every five minutes with a timed thread implemented in the router) that an active session between the router and the client device is less than an allowed session time (e.g. two hours). In step 3004, it is determined that the client device is associated to the SSID when the active session between the router and the client device is less than the allowed session time. In step 3006, the active session is closed when the client device is not associated to the SSID. In step 3008, a permission in a router firewall provided for the client device can be removed.

CONCLUSION

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java, Python) and/or some specialized application-specific language (PHP, JavaScript, XML). It is noted that JavaScript has been used as an example in several embodiments. However, in other embodiments, another scripting language and/or JavaScript variants can be utilized as well.

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computer-implemented method of a providing a captive portal with a router, the method comprising:
    implementing a hotspot managed by a router, wherein the hotspot comprises an Internet-access over a wireless local area network (WLAN) through a router communicatively coupled to an Internet service provider, wherein the WLAN is identified with a service set identifier (SSID);
    initiating a connection with a client device;
    detecting, with at least one processor, an HTTP request to a web server from the client device;
    restricting, with a firewall rule, an internet communication to a Transmission Control Protocol (TCP) port used by a Hypertext Transfer Protocol (HTTP) or a TCP port used by an alternative HTTP Secure port;
    transparently routing the HTTP request to an internal HTTP proxy server running on an alternative HTTP TCP port in the router, wherein the internal HTTP proxy server determines a requested web site's uniform resource locator (URL) and determines whether the requested web site's URL is allowed into a walled garden maintained by the router, wherein the router serves a light HyperText Markup Language (HTML) web page that redirects a web browser of the client device to an internal web server where a captive portal is hosted when the requested web site's URL is not allowed into the walled garden, and wherein the router routes a request for the requested web site's URL by the web browser of the client device to an internal web server associated with the requested web site's URL when the requested web site's URL is allowed into the walled garden;
    connecting the web browser of the client device with the internal webserver;
    obtaining, with a web browser in the internal web server, the HTML page served by the internal HTTP proxy server;
    generating, with the internal web server, a screenshot of a requested web site by calling to the requested website, wherein the captive portal's welcome page is layered over the screen shot in an opaque light-box format;
    serving, with the internal webserver, a captive portal's welcome page over the screenshot;
    periodically determining, with a timed thread implemented in the router, that an active session between the router and the client device is less than an allowed session time;
    determining that the client device is associated to the SSID when the active session between the router and the client device is less than the allowed session time;
    closing the active session when the client device is not associated to the SSID;
    removing a permission in a router firewall provided for the client device, and wherein the timed thread determines that the active session between the router and the client device is less than the allowed session at five minutes intervals, and wherein a time-limit of the active session is two hours.

2. The computer-implemented method of claim 1, wherein the step of determining that the client device is associated to the SSID when the active session between the router and the client device is less than an allowed session time further comprises: checking a Dynamic Host Configuration Protocol (DHCP) lease-file entry to determine that the client device is associated to the SSID when the active session between the router and the client device is less than the allowed session time.

3. The computer-implemented method of claim 1, wherein the router automatically resolves the requested web site's URL to the internal address of the WLAN using an internal Domain Name System (DNS) server acting as a master server for a domain party providing the WLAN.

4. The computer-implemented method of claim 1, wherein the TCP port used by the HTTP comprises TCP port 80, and wherein the TCP port used by an alternative HTTP Secure port comprises TCP port 8443.

5. The computer-implemented method of claim 1, wherein the internal web server obtains the requested web site's URL from a reference parameter set by the HTML page served by the internal HTTP proxy.

6. The computer-implemented method of claim 1, wherein the captive portal's welcome page comprises a presentation of an advertisement digital video display.

7. The computer-implemented method of claim 1, wherein the alternative HTTP TCP port comprises an 8008 TCP port, and wherein the HTTP proxy server uses the 8008 TCP port to obtain the screenshot of the requested web site's URL.

8. The computer-implemented method of claim 5 furthering comprising:
    providing, with the internal web server, a blurred version of the screen shot to the web browser of the client device with the internal web server.

9. The computer-implemented method of claim 8, wherein an internal webkit engine implemented with the router generates the screenshot.

10. A router system comprising: a processor configured to execute instructions; a memory containing instructions when executed on the processor, causes the processor to perform operations that: implement a hotspot managed by the router, wherein the hotspot comprises an Internet-access over a wireless local area network (WLAN) through a router communicatively coupled to an Internet service provider, wherein the WLAN is identified with a service set identifier (SSID); initiate a connection with a client device; detect, with at least one processor, an HTTP request to a web server from the client device; restrict, with a firewall rule, an internet communication to a Transmission Control Protocol (TCP) port used by a Hypertext Transfer Protocol (HTTP) or a TCP port used by an alternative HTTP Secure port; transparently route the HTTP request to an internal HTTP proxy server running on an alternative HTTP TCP port in the router, wherein the internal HTTP proxy server determines a requested web site's uniform resource locator (URL) and determines whether the requested web site's URL is allowed into a walled garden maintained by the router; wherein the router serves a light HyperText Markup Language (HTML) web page that redirects a web browser of the client device to an internal web server where a captive portal is hosted when the requested web site's URL is not allowed into the walled garden, and wherein, the router routes a request for the requested web site's URL by the web browser of the client device to an internal web server associated with the requested web sites URL when the requested web site's URL is allowed into the walled garden; connect the web browser of the client device with the internal webserver; obtain, with a web browser in the internal web server, the HTML page served by the internal HTTP proxy server; generate, with the internal webserver a screenshot of a requested web site by calling to the requested website; and serve, with the internal webserver, a captive portal's welcome page over the screenshot; periodically determining, with a timed thread implemented in the router, that an active session between, the router and the client device is less than an allowed session time; determines that the client device is associated to the SSID when the active session between the router and the client device is less than the allowed session time; closes the active session when the client device is not associated to the SSID; and removes a permission in a router firewall provided for the client device; and wherein the timed thread determines that the active session between the router and the client device is less than the allowed session at five minute intervals, and wherein a time-limit of the active session is two hours.

11. The router system of claim 10, wherein the captive portal's welcome page is layered over the screen shot in an opaque light-box format, wherein the alternative HTTP TCP port comprises an 8008 TCP port, and wherein the HTTP proxy server uses the 8008 TCP port to obtain the screenshot of the requested web site's URL, and wherein the captive portal's welcome page comprises a presentation of a digital video display advertisement.

12. A method comprising: connecting a client device with a router in a wireless local area network (WLAN), wherein the router comprises a captive portal; receiving, with the router, an HTTP request for a web server from the client device; constraining an internet communication of the router to a specified Transmission Control Protocol (TCP) port; routing the HTTP request to a proxy server operating in the router, identifying a requested web site's uniform resource locator (URL), wherein the requested web site's URL is received from the client device; serving, with the router, a HyperText Markup Language (HTML) web page that redirects a web browser of the client device to an internal web server; routing a request for the requested web site's URL by the web browser of the client device to an internal web server associated with the requested web site's URL; connecting the web browser of the client device with the internal webserver; generating, with the router, a screenshot of a requested web site by calling to the requested website, wherein the captive portal's welcome page is layered over the screen shot in a light-box-format; and obtaining, with the internal web server, wherein the internal web server is in the router, the HTML page served by the proxy server; and periodically determining, with a timed thread implemented in the router, that an active session between, the router and the client device is less than an allowed session time; determines that the client device is associated to the SSID when the active session between the router and the client device is less than the allowed session time; closes the active session when the client device is not associated to the SSID; and removes a permission in a router firewall provided for the client device; and wherein the timed thread determines that the active session between the router and the client device is less than the allowed session at five minute intervals, and wherein a time-limit of the active session is two hours.

13. The method of claim 12 further comprising:
serving, with the internal webserver, a captive portal's welcome page visually laid over the screenshot, wherein the captive portal's welcome page comprises an advertisement.

14. The method of claim 13, wherein the specified TCP port comprises a TCP port used by a Hypertext Transfer Protocol (HTTP) or a TCP port used by an alternative HTTP Secure port.

* * * * *